(12) United States Patent
Oda et al.

(10) Patent No.: US 6,699,310 B2
(45) Date of Patent: Mar. 2, 2004

(54) EVAPORATIVE FUEL ADSORBING MEMBER AND AIR CLEANER

(75) Inventors: Kouichi Oda, Kariya (JP); Takanobu Kawano, Okazaki (JP); Masaki Takeyama, Okazaki (JP); Naoya Kato, Ama-gun (JP)

(73) Assignees: Toyoda Boshoku Corporation, Kariya (JP); Nippon Soken, Inc., Nishio (JP)

( * ) Notice: Subject to any disclaimer, the term of this patent is extended or adjusted under 35 U.S.C. 154(b) by 32 days.

(21) Appl. No.: 10/319,611

(22) Filed: Dec. 16, 2002

(65) Prior Publication Data

US 2003/0116021 A1 Jun. 26, 2003

(30) Foreign Application Priority Data

Dec. 26, 2001 (JP) ........................................ 2001-394404

(51) Int. Cl.$^7$ .............................................. B01D 53/04
(52) U.S. Cl. ..................... 96/132; 96/135; 96/147; 96/153; 96/154; 55/385.3
(58) Field of Search ................ 96/121, 131, 132, 96/134–139, 147, 151–154; 55/385.3, 486–489, 515–519

(56) References Cited

U.S. PATENT DOCUMENTS

| 86,766 A | * | 2/1869 | Lesperance ................... 96/132 |
| 1,802,941 A | * | 4/1931 | Drager ........................ 96/131 |
| 1,843,446 A | * | 2/1932 | Drager ........................ 96/131 |
| 3,016,108 A | * | 1/1962 | Myddelton .................... 96/152 |
| 3,025,233 A | * | 3/1962 | Figert ....................... 210/502.1 |
| 3,368,326 A | * | 2/1968 | Hervert ........................ 96/109 |
| 3,380,810 A | * | 4/1968 | Hamblin ...................... 422/176 |
| 3,384,241 A | * | 5/1968 | Nostrand ..................... 210/315 |
| 3,507,621 A | * | 4/1970 | Goodman et al. ............. 96/151 |
| 3,541,765 A | * | 11/1970 | Adler et al. .................. 96/138 |
| 3,572,013 A | * | 3/1971 | Hansen ........................ 96/138 |
| 3,572,014 A | * | 3/1971 | Hansen ........................ 96/138 |
| 3,681,898 A | * | 8/1972 | Hopkins et al. ............... 55/487 |
| 3,722,189 A | * | 3/1973 | Tourtellotte .................. 96/152 |
| 3,727,597 A | * | 4/1973 | Hensler ....................... 123/519 |
| 3,747,303 A | * | 7/1973 | Jordan ........................ 96/135 |
| 3,849,093 A | * | 11/1974 | Konishi et al. ................ 96/138 |
| 4,259,096 A | * | 3/1981 | Nakamura et al. ............. 96/138 |
| 4,261,717 A | * | 4/1981 | Belore et al. .................. 96/112 |
| 4,279,630 A | * | 7/1981 | Nakamura et al. ............. 96/138 |
| 4,418,662 A | * | 12/1983 | Engler et al. ................. 96/133 |
| 4,743,279 A | * | 5/1988 | Kvist et al. ................... 96/139 |
| 5,129,929 A | * | 7/1992 | Linnersten ................. 96/117.5 |
| 5,226,937 A | * | 7/1993 | Linnersten et al. ......... 96/117.5 |
| 5,354,365 A | * | 10/1994 | Youn ........................... 96/135 |
| 5,423,903 A | * | 6/1995 | Schmitz et al. ............... 96/134 |
| 6,152,996 A | * | 11/2000 | Linnersten et al. ........... 96/135 |
| 6,309,451 B1 | * | 10/2001 | Chen .......................... 96/134 |
| 6,312,489 B1 | * | 11/2001 | Ernst et al. .................. 55/385.3 |
| 6,348,086 B1 | * | 2/2002 | Harms et al. ................. 96/125 |
| 6,383,268 B2 | * | 5/2002 | Oda ........................... 96/134 |
| 6,440,200 B1 | * | 8/2002 | Sakakibara et al. ........... 96/134 |
| 6,464,761 B1 | * | 10/2002 | Bugli .......................... 96/135 |
| 2001/0035094 A1 | * | 11/2001 | Takagaki et al. .............. 96/154 |
| 2002/0124733 A1 | * | 9/2002 | Iriyama et al. ............... 96/134 |
| 2002/0129711 A1 | * | 9/2002 | Oda et al. .................... 96/134 |
| 2003/0066427 A1 | * | 4/2003 | Ishida ......................... 96/135 |

FOREIGN PATENT DOCUMENTS

| GB | 2181967 A | * | 5/1987 |
| JP | Y2 62-35883 | | 9/1987 |
| WO | WO 93/05865 A1 | * | 1/1993 |

* cited by examiner

Primary Examiner—Robert H. Spitzer
(74) Attorney, Agent, or Firm—Oliff & Berridge, PLC

(57) ABSTRACT

An HC adsorbing sheet inside an air cleaner is disposed such that a large amount of activated carbon is contained on the side of an engine and that a small amount of activated carbon is contained on the other side of the engine. Thus, the HC adsorbing sheet can efficiently adsorb evaporative fuel. That is, by changing the amount of activated carbon contained in accordance with differences in concentration of evaporative fuel, it becomes possible to prevent the pressure loss in an intake system from increasing. On the other hand, one end of a second intake pipe extends to a region where the amount of activated carbon contained in the HC adsorbing sheet is large, whereby it becomes possible to concentratively supply activated carbon with intake air in the region where the large amount of activated carbon is contained. Therefore, the efficiency in purging evaporative fuel can be prevented from declining.

24 Claims, 21 Drawing Sheets

FIG. 23A
FIG. 23B
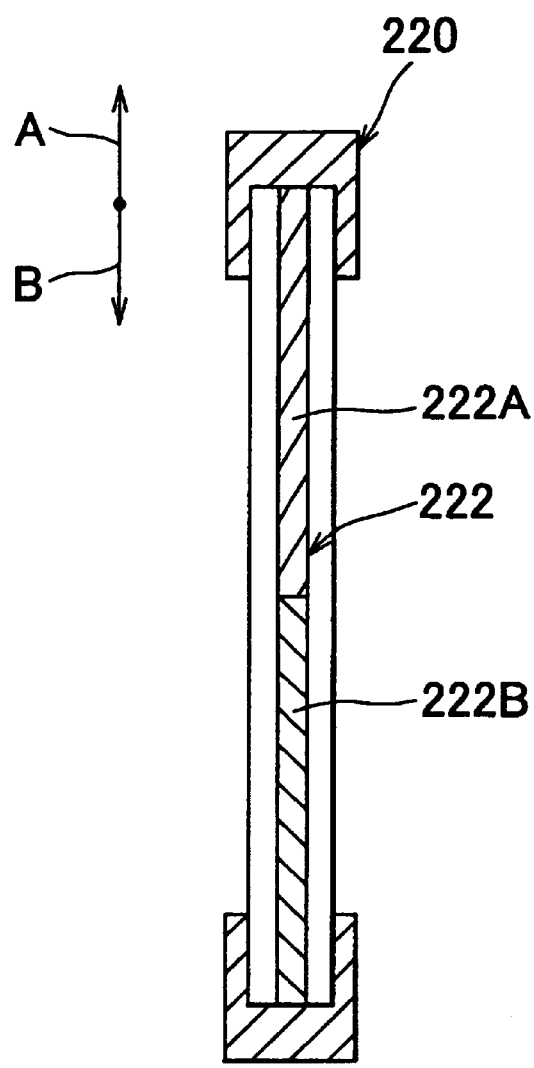
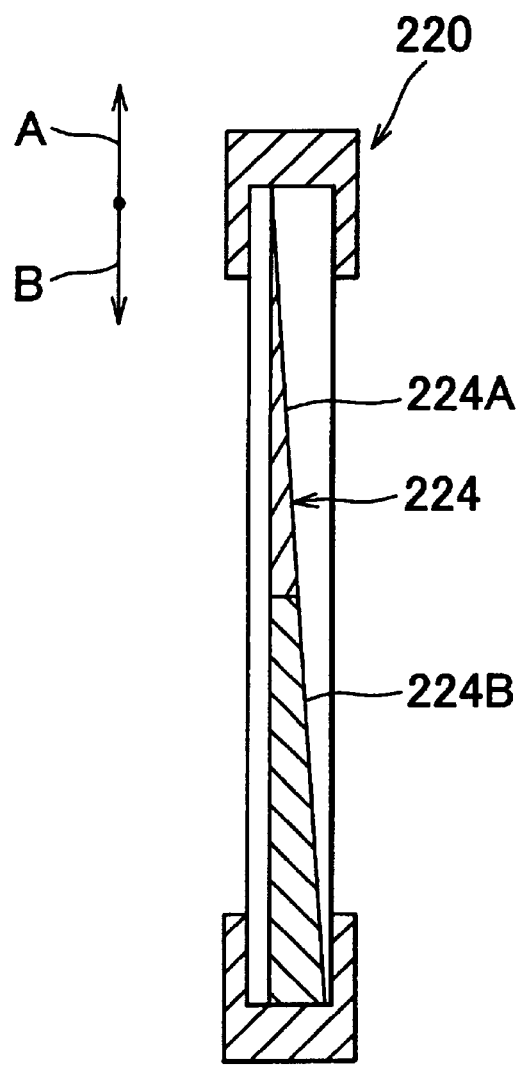
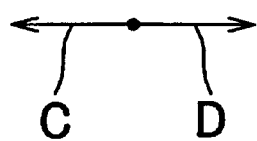
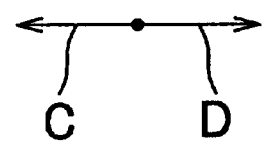

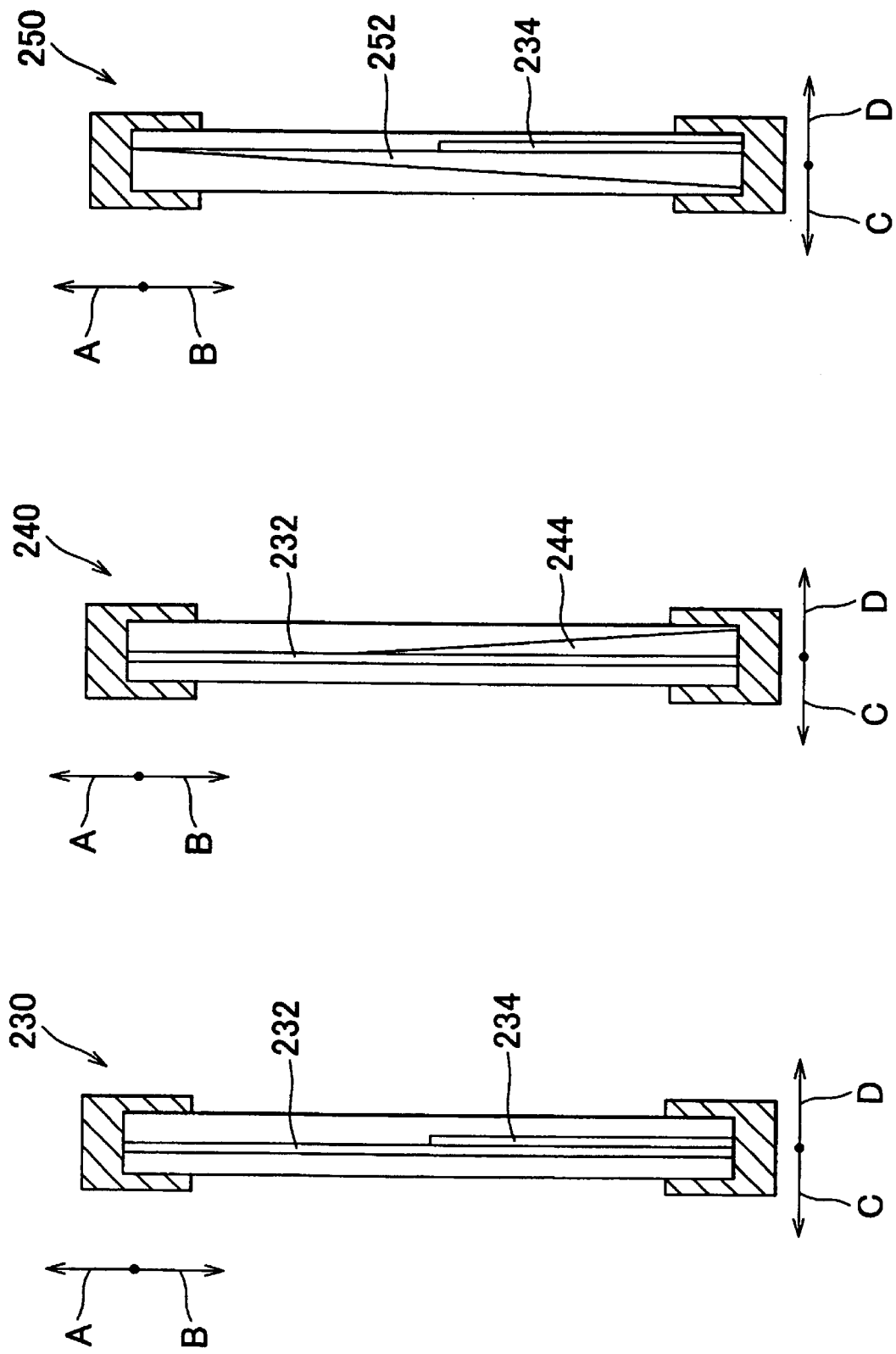

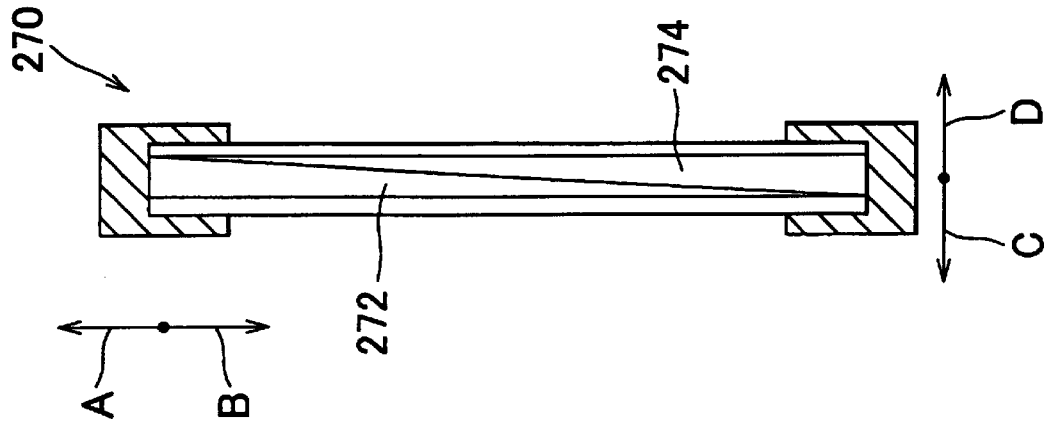
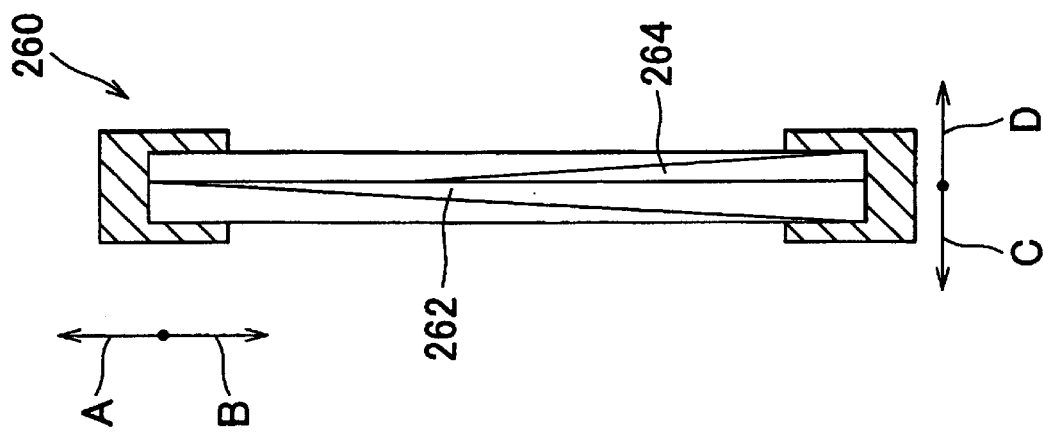

EVAPORATIVE FUEL ADSORBING MEMBER AND AIR CLEANER

The disclosure of Japanese Patent Application No. 2001-394404 filed on Dec. 26, 2001, including the specification, drawings, and abstract is incorporated herein by reference in its entirety.

BACKGROUND OF THE INVENTION

1. Field of the Invention

The invention relates to an evaporative fuel adsorbing member disposed inside an air cleaner that is connected, for example, to an engine. The invention also relates to an air cleaner.

2. Description of the Related Art

The fact that regulations with regard to HC (hydrocarbons) that are discharged from a vehicle during stoppage thereof have been tightened in recent years causes a problem in that fuel remaining in an engine during stoppage of the vehicle and fuel that has leaked out from injectors are vaporized and leak out from a suction port of an intake pipe through an air cleaner.

Thus, as disclosed in Japanese Utility Model No. 62-35883 or the like, there has been devised an intake-system evaporative fuel adsorbing system in which an evaporative fuel adsorbing member such as a filter containing activated carbon is installed close to an intake duct, an air cleaner, or the like so as to prevent evaporative fuel from leaking out from a suction port.

In the aforementioned evaporative fuel adsorbing member, activated carbon for adsorbing evaporative fuel is homogeneously contained as a whole. Therefore, in order to capture a large amount of evaporative fuel, the evaporative fuel adsorbing member needs to be increased in thickness.

However, if the evaporative fuel adsorbing member is increased in thickness, the pressure loss in the entire intake system is increased. For this reason, the original performance of sucking air in the intake system may be reduced.

SUMMARY OF THE INVENTION

It is an object of the invention to provide an evaporative fuel adsorbing member and an air cleaner which are capable of efficiently adsorbing evaporative fuel and preventing a decline in the performance of sucking air by partially enhancing the performance of adsorbing evaporative fuel in a region containing a high concentration of evaporative fuel. It is another object of the invention to provide an evaporative fuel adsorbing member and an air cleaner which are capable of preventing adsorbent from deteriorating in purging efficiency.

A first aspect of the invention relates to an evaporative fuel adsorbing member that is disposed inside an air cleaner connected to an internal combustion engine and that has an adsorbent for adsorbing evaporative fuel that has flown backwards from the side of the internal combustion engine. This evaporative fuel adsorbing member comprises a first portion having a predetermined amount of the adsorbent, and a second portion having more than the predetermined amount of the adsorbent. In the first aspect, the evaporative fuel flows backwards into the second portion at a higher concentration than into the first portion.

It is to be noted herein that evaporative fuel is heavier than air and thus is not uniformly diffused. That is, when evaporative fuel flows backwards, the concentration of evaporative fuel (the concentration of HC) is high in a certain region inside the air cleaner, and the concentration of evaporative fuel (the concentration of HC) is low in another region inside the air cleaner. In other words, there are some differences in concentration of evaporative fuel inside the air cleaner.

Thus, as in the case of the first aspect, the adsorbent is disposed in the evaporative fuel adsorbing member such that the amount of the adsorbent contained in the evaporative fuel adsorbing member partially differs in accordance with the concentration of evaporative fuel flowing backwards. For example, a large amount of the adsorbent is disposed in a region into which a high concentration of evaporative fuel flows, and a small amount of the adsorbent is disposed in a region which contains a low concentration of evaporative fuel. In this manner, evaporative fuel can be efficiently adsorbed without excessively increasing the volume of the evaporative fuel adsorbing member. As a result, it is possible to prevent the pressure loss in a so-called intake system from increasing as a whole.

It is to be noted in the present specification that "the vertical direction" means a direction in which gravity works, and that "the horizontal direction" means a direction perpendicular to "the vertical direction".

It is also to be noted in the present specification that "the vertically lower portion" of the evaporative fuel adsorbing member is located on the vertically lower side with respect to the center of the evaporative fuel adsorbing member, and that "the vertically upper portion" of the evaporative fuel adsorbing member is located on the vertically upper side with respect to the center of the evaporative fuel adsorbing member.

It is also to be noted in the present specification that "the engine-side portion" of the evaporative fuel adsorbing member is located on the side of the internal combustion engine with respect to the center of the evaporative fuel adsorbing member, and that "the non-engine portion" of the evaporative fuel adsorbing member is located on the other side of the internal combustion engine with respect to the center of the evaporative fuel adsorbing member.

A second aspect of the invention relates to an evaporative fuel adsorbing member that is disposed inside an air cleaner connected to an internal combustion engine and that has an adsorbent for adsorbing evaporative fuel that has flown backwards from the side of the internal combustion engine. The evaporative fuel flowing backwards from the side of the internal combustion engine contains a plurality of kinds of components with different boiling points. To efficiently adsorb such evaporative fuel, the evaporative fuel adsorbing member has a plurality of kinds of the adsorbent with different pore diameters, and the plurality of kinds of the adsorbent with the different pore diameters are disposed in the evaporative fuel adsorbing member in accordance with ratios among the components contained in the evaporative fuel flowing backwards.

In general, high-boiling components of evaporative fuel tend to float along the bottom surface of an air cleaner.

Thus, according to the evaporative fuel adsorbing member of the second aspect, the evaporative fuel adsorbing member contains, for example, a plurality of kinds of the adsorbent with different pore diameters, and the adsorbent with a relatively large pore diameter is located on the side of the bottom surface of the air cleaner. Due to this construction, the high-boiling components of evaporative fuel can be efficiently adsorbed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 23A and 23B are cross-sectional views of evaporative fuel adsorbing members in accordance with modification examples of the first to fourth embodiments; and FIGS. 24A to 24E are cross-sectional views of evaporative fuel adsorbing members in accordance with modification examples of the first to fourth embodiments.

DETAILED DESCRIPTION OF PREFERRED EMBODIMENTS

[First Embodiment]

Hereinafter, the evaporative fuel adsorbing member and the air cleaner in accordance with the first embodiment of the invention will be described with reference to the accompanying drawings.

Figure 1:
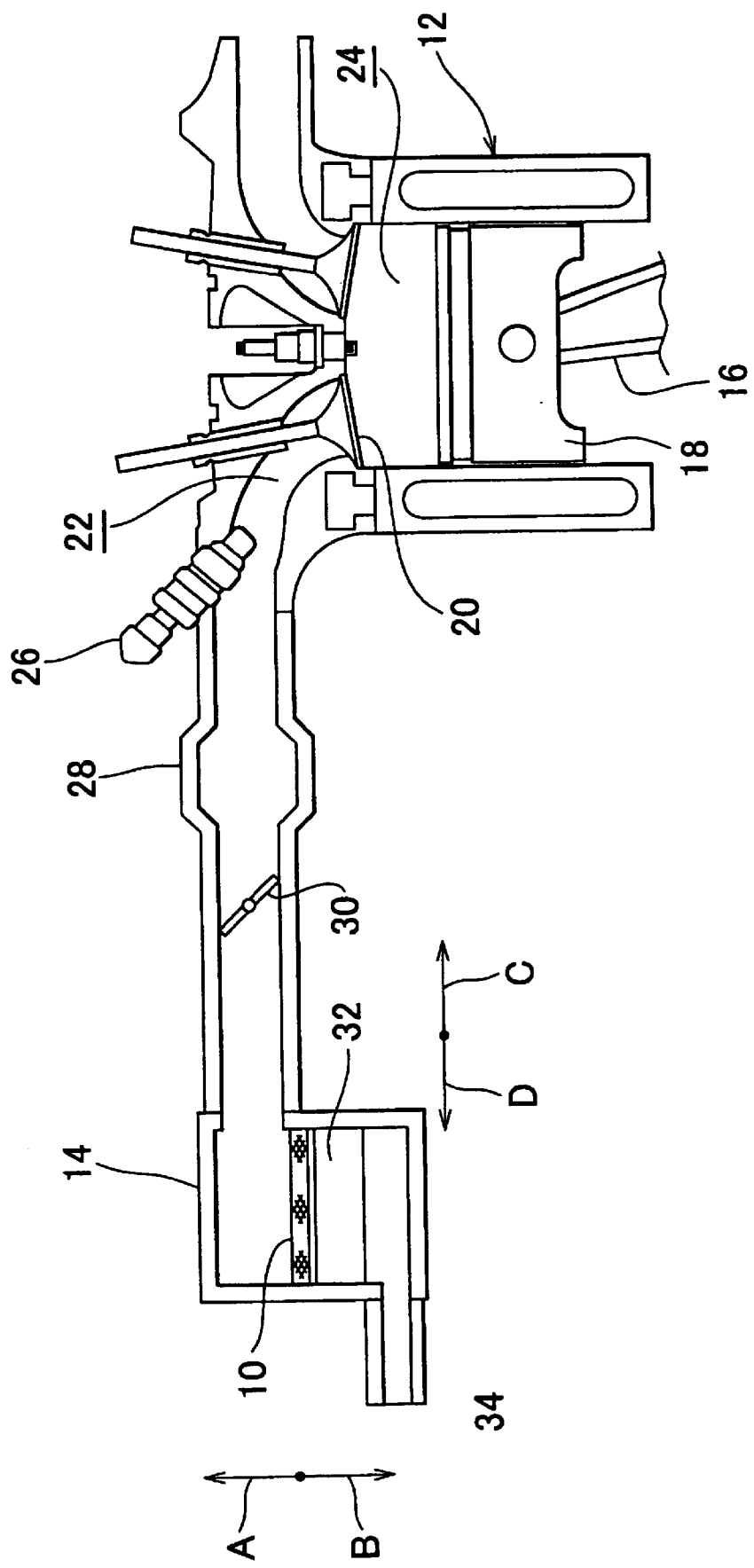
FIG. 1 is a structural view in which an air cleaner equipped with an evaporative fuel adsorbing member in accordance with a first embodiment of the invention is connected to an engine.

As shown in FIG. 1, an HC adsorbing sheet 10 (the evaporative fuel adsorbing member) for adsorbing hydrocarbons (HC) as evaporative fuel is disposed inside an air cleaner 14 that is located upstream of an engine 12 (internal combustion engine).

A piston 18 operating through a link mechanism 16 or the like is disposed inside the engine 12. The engine 12 has an intake valve 20. An intake port 22 is formed outside the intake valve 20. An injector 26 for injecting gasoline into a combustion chamber 24 is disposed close to the intake port 22.

An first intake pipe 28 is connected at one end thereof to the intake port 22. A throttle valve 30 is disposed inside the first intake pipe 28.

The first intake pipe 28 is connected at the other end thereof to the air cleaner 14.

In the first embodiment, the first intake pipe 28 is connected at the other end thereof to an upper portion of the air cleaner 14 (as indicated by an arrow A in FIG. 1, on the vertically upper side).

An air filter 32 for filtering intake air is disposed beneath the HC adsorbing sheet 10 (as indicated by an arrow B in FIG. 1). A second intake pipe 34 for introducing outside air is connected to a lower portion (as indicated by the arrow B in FIG. 1, on the vertically lower side) of the air cleaner 14 at a location beneath the air filter 32.

It is because of the purpose of preventing dust or the like from adhering to the HC adsorbing sheet 10 by allowing passage of air filtered by the air filter 32 that the air filter 32 is disposed beneath the HC adsorbing sheet 10.

The structure of the HC adsorbing sheet 10 as an essential part of the first embodiment will now be described in detail.

Figure 2A:
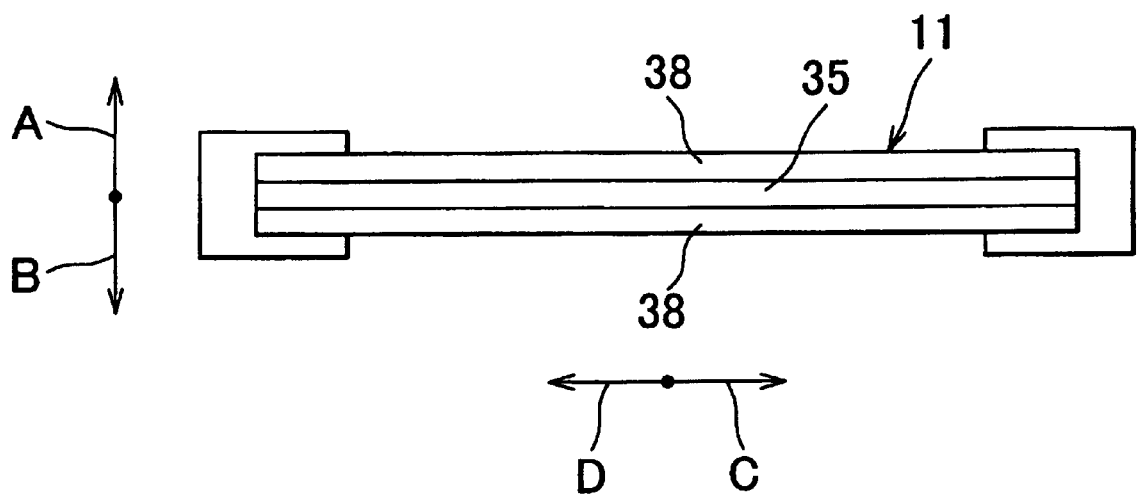
FIG. 2A is a structural view of the evaporative fuel adsorbing member with the amount of an adsorbent being homogeneous over the entire surface thereof.
Figure 2B:
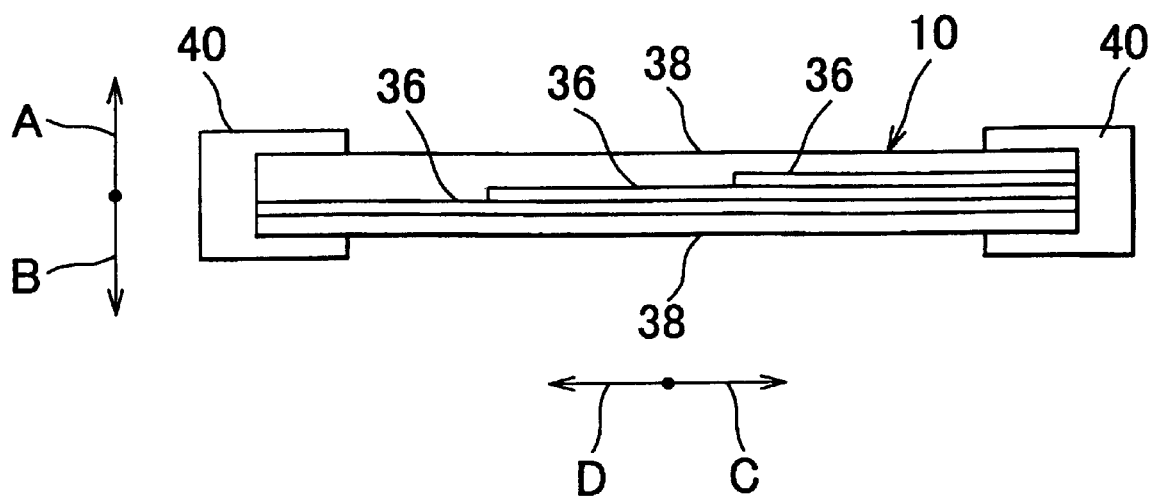
FIG. 2B is a structural view of the evaporative fuel adsorbing member disposed in the air cleaner in accordance with the first embodiment.

As shown in FIG. 2B, three sheets 36 containing activated carbon (adsorbent, not shown) are superimposed to constitute the HC adsorbing sheet 10 of the first embodiment. It is to be noted, however, that the sheets 36 containing activated carbon are not simply superimposed. That is, the sheets 36 containing activated carbon are superimposed in such a manner as to form a three-layer structure in an engine-side portion, a one-layer structure in a non-engine-side portion, and a two-layer structure in a portion between them.

That is, the HC adsorbing sheet 10 of the first embodiment is designed such that the number of layers constituted by the sheets 36 containing activated carbon is increased in proportion to a decrease in distance from the engine 12 and that the number of layers constituted by the sheets 36 containing activated carbon is reduced to one in proportion to an increase in distance from the engine 12. Hence, in the HC adsorbing sheet 10, the amount of activated carbon is large in the engine-side portion, whereas the amount of activated carbon is small in the non-engine-side portion.

Although the number of the sheets 36 superimposed to constitute the HC adsorbing sheet 10 of the first embodiment is three, the amount of activated carbon contained in the entire HC adsorbing sheet 10 is the same as the amount of activated carbon contained in the HC adsorbing sheet of the related art of FIG. 2A.

Figure 2C:
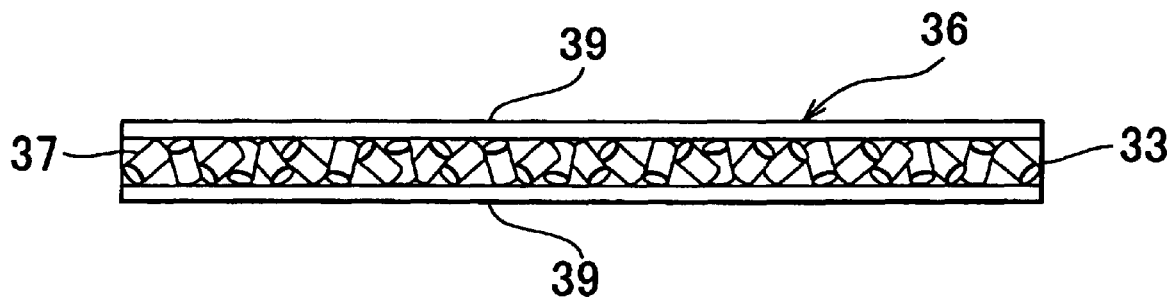
FIG. 2C is a cross-sectional view of a sheet containing activated carbon of FIG. 2B.

The sheets 36 containing activated carbon are wrapped with non-woven fabrics 38 and are framed by a casing 40. The non-woven fabrics 38 serve to prevent fragments of activated carbon from being scattered outside. As shown in FIG. 2C, the sheet 36 is constructed as air-permeable sheets 39 (e.g., non-woven fabrics) applied to both surfaces of a sheet 33 consisting of activated carbon 37 by adhesive agent.

Next, the operation and effect of the evaporative fuel adsorbing member 10 and the air cleaner 14 will be described.

Gasoline injected from the injector 26 during operation of the engine 12 flows into the combustion chamber 24 through the intake port 22. At this moment, the gasoline adheres to an intake system that is composed of the intake port 22, the intake valve 20, the piston 18, and the like.

If the engine 12 is stopped in this state, HC contained in gasoline, which have adhered to the intake system, flow backwards toward the air cleaner 14 through a gap formed between the throttle valve 30 and the first intake pipe 28. Then, the HC flow into the air cleaner 14.

Because HC are heavier than air, they slowly flow along a bottom portion of the first intake pipe 28 toward the air cleaner 14. Hence, the concentration of HC is inhomogeneous in the first intake pipe 28 and the air cleaner 14. That is, the concentration of HC is relatively high in the vicinity of a bottom portion of the first intake pipe 28 and inside the air cleaner 14 on the engine side (as indicated by an arrow C in FIG. 2).

As described above, the HC adsorbing sheet 10 of the first embodiment is designed such that the number of layers constituted by the sheets 36 containing activated carbon is increased in proportion to a decrease in distance from the engine 12 and that the number of layers constituted by the sheets 36 containing activated carbon is reduced to one in proportion to an increase in distance from the engine 12 (as indicated by an arrow D in FIG. 2). Thus, in the HC adsorbing sheet 10, the amount of activated carbon is large in the portion with a relatively high concentration of HC, whereas the amount of activated carbon is small in the portion with a relatively low concentration of HC. Therefore, the HC adsorbing sheet 10 can efficiently adsorb HC. As a result, the HC adsorbing sheet 10 can prevent the pressure loss in the intake system from increasing, as opposed to an HC adsorbing sheet 11 that is constructed by a single sheet 35 containing activated carbon whose thickness is homogeneous is wrapped with non-woven fabrics 38 as shown in FIG. 2A. The sheet 35 is same construction as the sheet 36.

Figure 19:
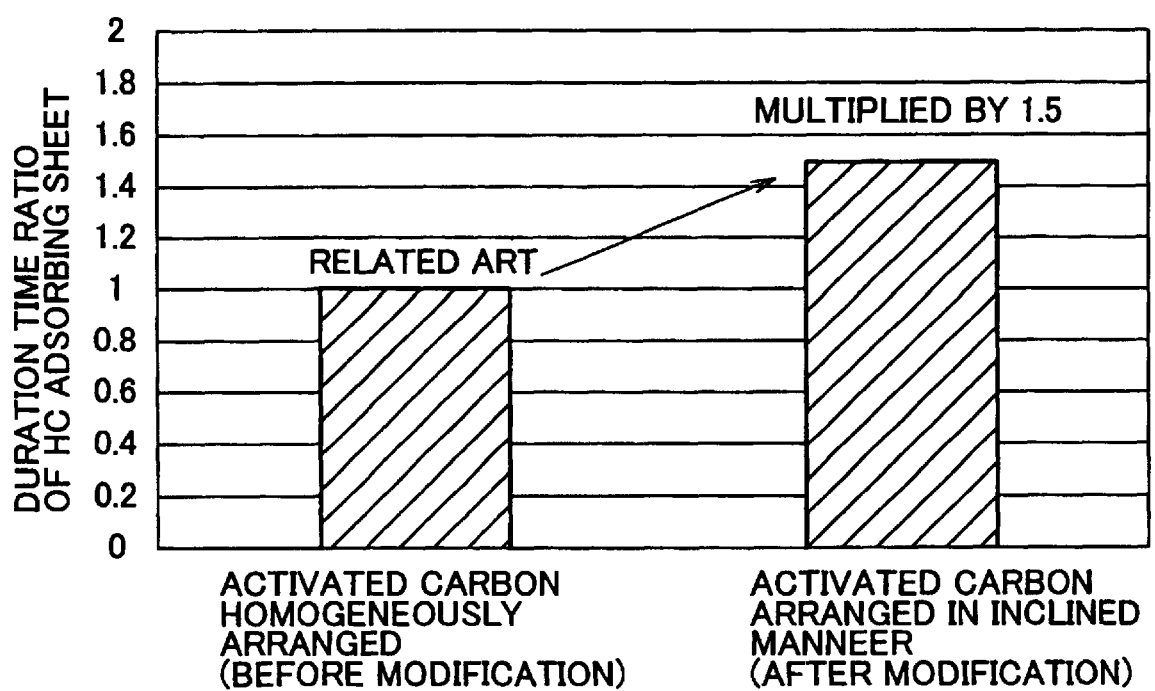
FIG. 19 is a graph showing durability of the evaporative fuel adsorbing member in accordance with the first embodiment.

As shown in FIG. 19, the life of the HC adsorbing sheet 1 (FIG. 2B) of the first embodiment in which activated carbon is arranged in a quantitatively inclined manner can be made as 1.5 times as long as the life of the HC adsorbing sheet (FIG. 2A) in which the amount of activated carbon is homogeneous.

[Second Embodiment]

Next, the evaporative fuel adsorbing member and the air cleaner in accordance with the second embodiment of the invention will be described.

The description of constructional details identical to those of the evaporative fuel adsorbing member and the air cleaner in accordance with the first embodiment will be suitably omitted.

Figure 3:
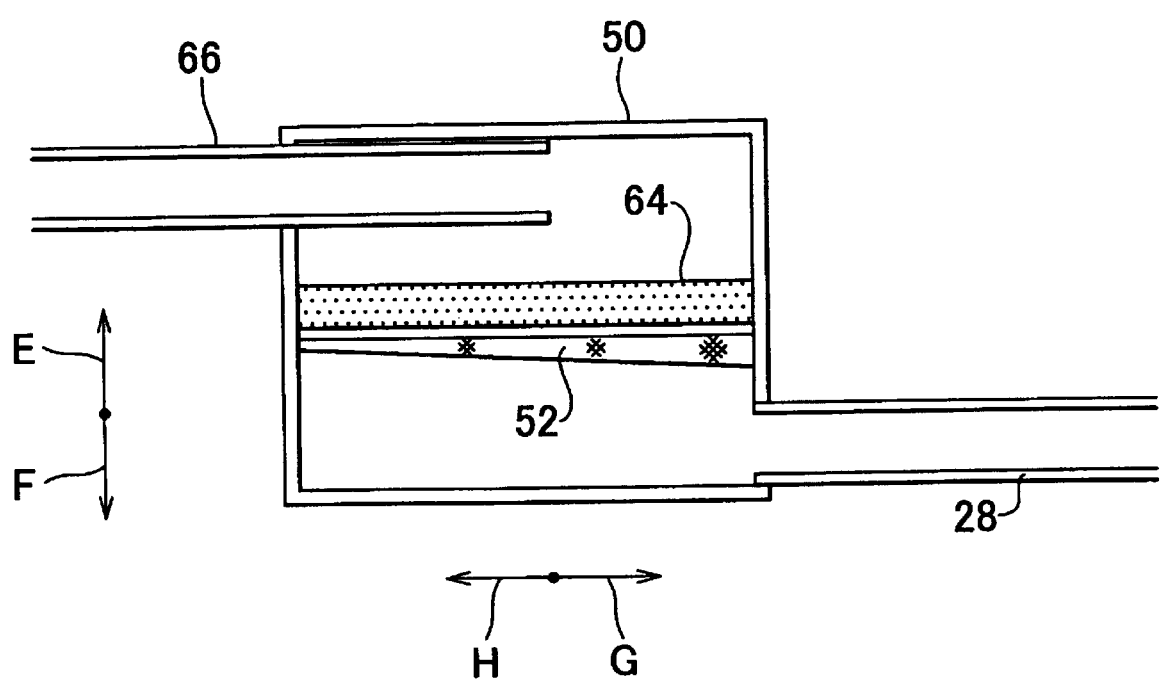
FIG. 3 is a structural view of an air cleaner in accordance with a second embodiment of the invention.

As shown in FIG. 3, the first intake pipe 28 is connected to a vertically lower portion (as indicated by an arrow F in FIG. 3) of an air cleaner 50 of the second embodiment.

An HC adsorbing sheet 52 is disposed inside the air cleaner 50 along a direction that is substantially perpendicular to the vertical direction.

Figure 4:
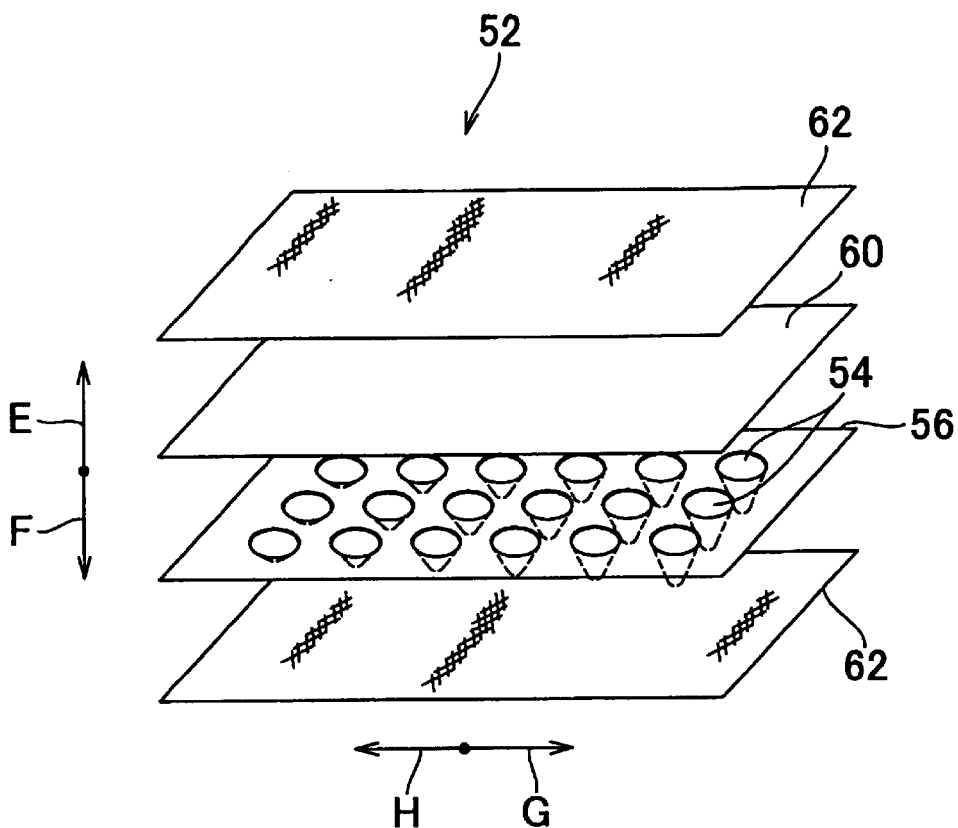
FIG. 4 is an exploded view of an evaporative fuel adsorbing member in accordance with the second embodiment.
Figure 5:
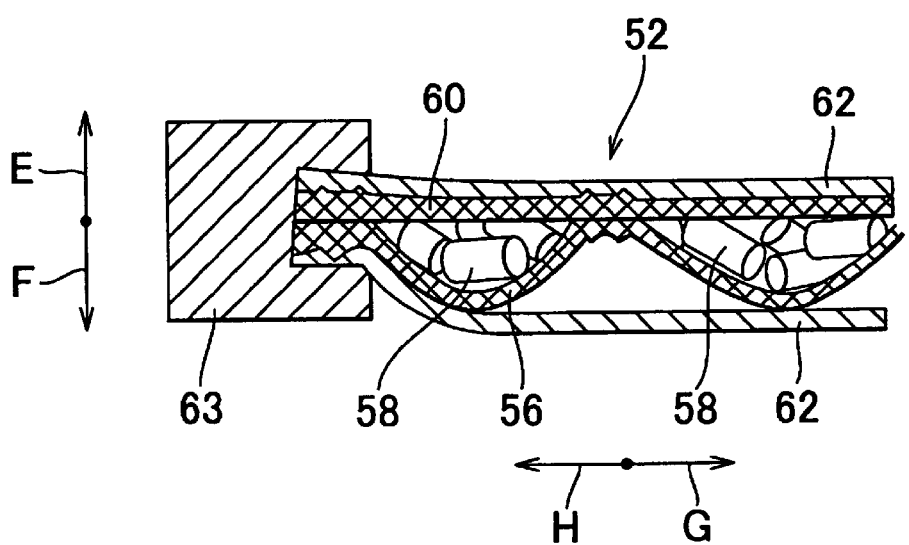
FIG. 5 is a cross-sectional view of the evaporative fuel adsorbing member in accordance with the second embodiment.

As shown in FIGS. 4 and 5, the HC adsorbing sheet 52 has a lower net 56 in which a plurality of dents 54 are formed. The dents 54 become deeper in proportion to a decrease in distance from the side of the engine 12 (as indicated by an arrow G in FIG. 4).

Activated carbon 58 (adsorbent) for adsorbing HC is disposed in the dents 54. Thus, the amount of activated carbon 58 contained in each one of the dents 54 increases in proportion to an increase in depth of that dent 54.

As shown in FIG. 4, an upper net 60 is located above the lower net 56 (as indicated by an arrow E in FIG. 4). The lower net 56 and the upper net 60 are welded by heat at their outer peripheral end portions and at their portions where no activated carbon 58 exists.

Hence, no air flows through the portions that have been welded by heat, such as the portions where no activated carbon 58 exists. Thus, air is all the more likely to flow into the dents 54 where activated carbon 58 exists. As a result, the dents 54 serve as passages through which air flows, and evaporative fuel and intake air constantly come into contact with activated carbon 58. Thus, the efficiency in adsorbing HC by means of activated carbon 58 can be enhanced, and the efficiency in purging HC adsorbed by activated carbon 58 can be enhanced as well.

It is to be noted herein that the lower net 56 and the upper net 60 are made of a thermoplastic material such as polypropylene. Although not shown, the lower net 56 and the upper net 60 are formed like small grids so as to prevent activated carbon 58 from falling.

By thus using the lower net 56 in which the dents 54 are formed to contain activated carbon 58, the position and amount of activated carbon 58 can be easily determined.

The lower net 56 and the upper net 60 are wrapped with non-woven fabrics 62 that are made of polyester. Thus, even if activated carbon 58 in the dents 54 has been broken into fragments, the fragments of activated carbon 58 can be captured by wrapping the lower net 56 and the upper net 60 with the fine non-woven fabrics 62.

After the lower net 56 and the upper net 60 have been wrapped with the non-woven fabrics 62, a supporting frame 63 made of resin is attached to outer peripheries of the non-woven fabrics 62.

Thus, the HC adsorbing sheet 52 is completed.

The HC adsorbing sheet 52 thus manufactured is disposed inside the air cleaner 50 such that the amount of activated carbon is large in an engine-side portion thereof (as indicated by the arrow G in FIG. 4) and that the amount of activated carbon is small in a non-engine-side portion thereof (as indicated by an arrow H in FIG. 4).

The HC adsorbing sheet 52 is disposed inside the air cleaner 50 with the supporting frame 63 being attached thereto. By adjusting the thickness of the supporting frame 63, it becomes possible to fix the HC adsorbing sheet 52 to the inside of the air cleaner 50.

On the other hand, as shown in FIG. 3, an air filter 64 is disposed above the HC adsorbing sheet 52 (as indicated by the arrow E in FIG. 3).

Furthermore, a second intake pipe 66 is connected to a vertically upper portion (as indicated by the arrow E in FIG. 3) of the air cleaner 50 at a location above the air filter 64. One end of the second intake pipe 66, which is located inside the air filter 64, extends to the side of the engine 12 (as indicated by the arrow G in FIG. 3), that is, to a region where the amount of activated carbon 58 contained in the HC adsorbing sheet 52 is large.

In general, it has been experimentally confirmed that evaporative fuel that has flown backwards from the side of an internal combustion engine (engine) is heavier than air and thus moves at a relatively low speed, and that the concentration of evaporative fuel inside an air cleaner in a portion close to the internal combustion engine is higher than the concentration of evaporative fuel inside the air cleaner in a portion far from the internal combustion engine.

Thus, by making the amount of activated carbon 58 contained in the engine-side portion of the evaporative fuel adsorbing member larger than the amount of activated carbon 58 contained in the non-engine-side portion of the evaporative fuel adsorbing member as in the case of the second embodiment, it becomes possible to efficiently adsorb evaporative fuel without excessively increasing the thickness (volume) of the HC adsorbing sheet 52. As a result, the pressure loss in the so-called intake system can be prevented from increasing as a whole.

By changing the depth of dents 70, it becomes possible to adjust the amount of activated carbon 58 contained in each of the dents 70 and to efficiently adsorb evaporative fuel.

According to the HG adsorbing sheet 52 and the air cleaner 50 of the second embodiment, evaporative fuel (HC) that is close to the engine-side portion of the HC adsorbing sheet 52 and that contains a high concentration of HC can be efficiently adsorbed by a large amount of activated carbon 58 contained in the engine-side portion of the HC adsorbing sheet 52. On the other hand, evaporative fuel (HG) that is close to the non-engine side portion of the HG adsorbing sheet 52 and that contains a low concentration of HG can be efficiently adsorbed by a small amount of activated carbon 58 contained in the non-engine portion of the HG adsorbing sheet 52.

It is thus possible to efficiently adsorb evaporative fuel (HC) in accordance with differences in concentration of evaporative fuel (HC), without increasing the amount of activated carbon 58 contained in the entire HC adsorbing sheet 52. As a result, the pressure loss of the intake system can be prevented from increasing.

In particular, according to the air cleaner 50 of the second embodiment, the second intake pipe 66 is connected to the upper portion of the air cleaner 50. Thus, HC, which are heavier than air, accumulate in a bottom portion of the air cleaner 50. As a result, the HC can be effectively prevented from leaking out from the second intake pipe 66.

On the other hand, if the engine 12 is restarted after stoppage thereof, air introduced from the second intake pipe 66 homogeneously flows through the air filter 64, and then flows through activated carbon 58. Thus, HC that have already been adsorbed by activated carbon 58 are separated. The HC thus separated are delivered to the combustion chamber 24 inside the engine 12 together with intake air.

If the amount of activated carbon 58 contained in the HC adsorbing sheet 52 is different in some areas in the HC adsorbing sheet 52 as in the case of the HC adsorbing sheet 52 of the second embodiment, intake air (purge air) tends to flow through the region where the amount of activated carbon contained in the HC adsorbing sheet 52 is small (the portion with a small pressure loss). Hence, it is probable that the purging efficiency of activated carbon 58 in the region where the amount of activated carbon contained in the HC adsorbing sheet 52 is small be enhanced and that the purging efficiency of activated carbon 58 in the region where the amount of activated carbon contained in the HC adsorbing sheet 52 is large be reduced on the other hand.

Thus, according to the second embodiment, one end of the second intake pipe 66 extends to the region where the amount of activated carbon contained in the HC adsorbing sheet 52 is large, whereby intake air can concentratively come into contact with activated carbon 58 in the region where the amount of activated carbon contained in the HC adsorbing sheet 52 is large. As a result, the purging efficiency of activated carbon 58 in the region where the amount of activated carbon contained in the HC adsorbing sheet 52 is large can be prevented from being reduced.

As described above, the second embodiment makes it possible to enhance both the efficiency in adsorbing HC and the efficiency in purging HC.

Figure 6A:
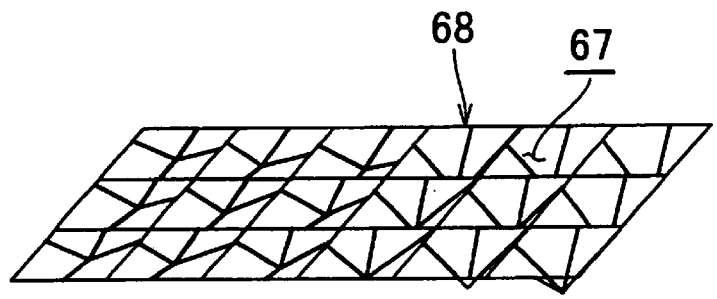
FIGS. 6A to 6C are perspective views each showing a modification example of a lower net constituting the evaporative fuel adsorbing member in accordance with the second embodiment.
Figure 6B:
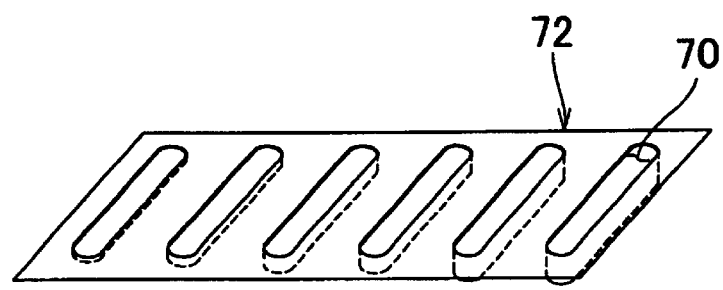
Figure 6C:
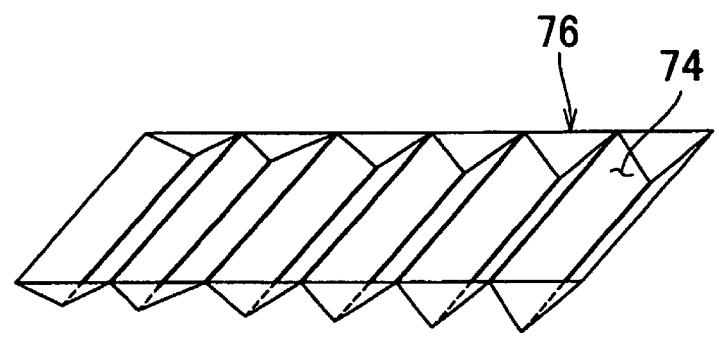

For example, as shown in FIG. 6A, a lower net 68 in which pyramidal dents 67 are formed may be used as an HC adsorbing sheet that is different in type from the HC adsorbing sheet 52. Further, as shown in FIG. 6B, a lower net 72 in which the dents 70 having elliptical openings are formed may also be used. Furthermore, a lower net 76 in which dents 74 having a triangular cross-section are formed may also be used.

The shape of the dents 54 formed in the lower net 56 is not to be limited to the aforementioned one. However, especially as shown in FIG. 6A, the amount of activated carbon 58 contained in each of the dents can be prevented from becoming inhomogeneous by forming the dents 67 like grids.

[Third Embodiment]

Next, the evaporative fuel adsorbing member and the air cleaner in accordance with the third embodiment of the invention will be described.

The description of constructional details identical to those of the evaporative fuel adsorbing member and the air cleaner in accordance with the first embodiment will be suitably omitted.

Figure 7:
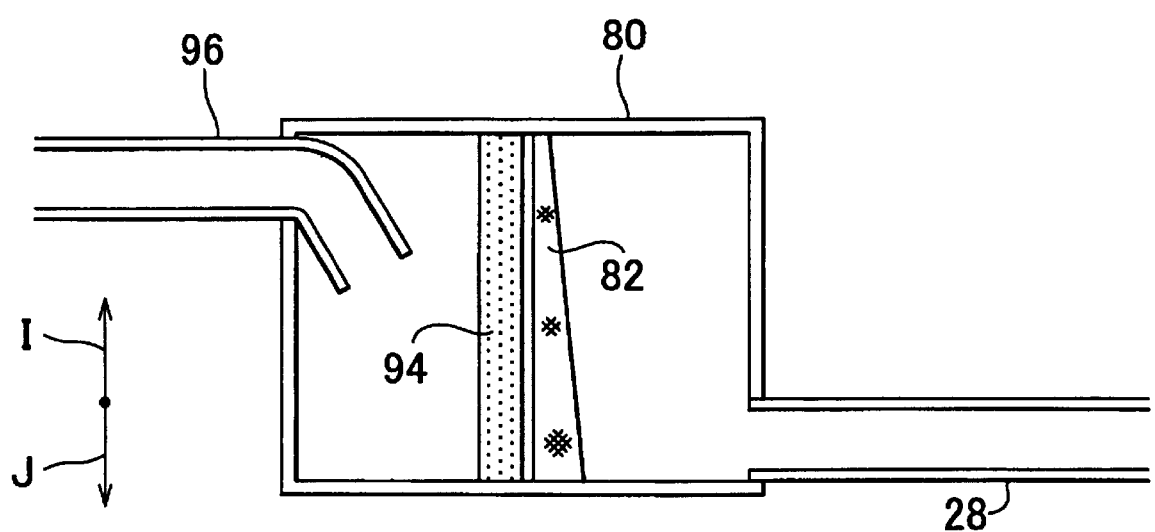
FIG. 7 is a structural view of an air cleaner in accordance with a third embodiment of the invention.

As shown in FIG. 7, an first intake pipe 28 is connected to a vertically lower portion (as indicated by an arrow J in FIG. 7) of an air cleaner 80 of the third embodiment.

An HC adsorbing sheet 82 is disposed inside the air cleaner 80 along the vertical direction.

Figure 8:
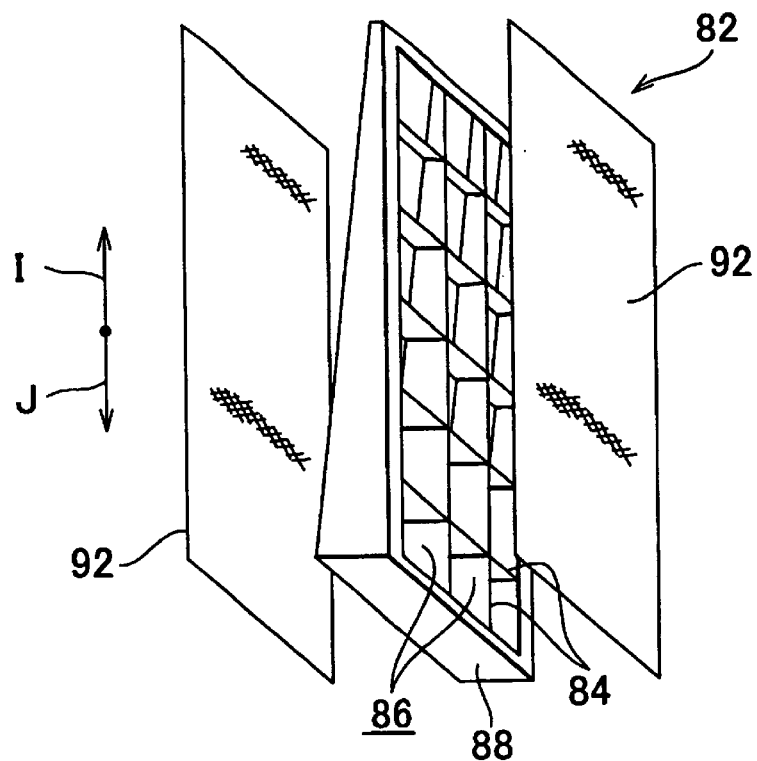
FIG. 8 is an exploded view of an evaporative fuel adsorbing member in accordance with the third embodiment.
Figure 9:
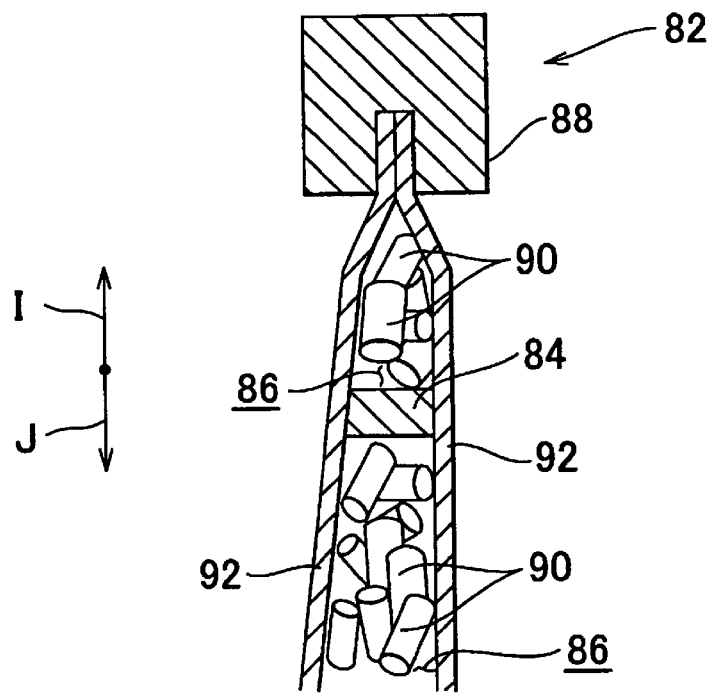
FIG. 9 is a cross-sectional view of the evaporative fuel adsorbing member in accordance with the third embodiment.

As shown in FIGS. 8 and 9, the HC adsorbing sheet 82 has a casing 88A, which is divided into a plurality of chambers 86 by partitions 84. The partitions 84 increase in height in proportion to a decrease in distance from the vertically lower side (as indicated by the arrow J in FIG. 7).

Activated carbon 90 (adsorbent) for adsorbing HG is disposed in each of the chambers 86. Thus, the amount of activated carbon 90 contained in each of the chambers 86 increases in proportion to an increase in height of a corresponding the-partition 84. The amount of activated carbon 90 contained in each of the chambers 86 is determined by adjusting the height of corresponding ones of the partitions 84.

As shown in FIGS. 8 and 9, fine non-woven fabrics 92 are stuck on both lateral surfaces of the casing 88A, so as to allow fragments of activated carbon 90 to be captured.

It is to be noted herein that the non-woven fabrics 92 function as both lateral surfaces of each of the chambers 86, and that each of the chambers 86 is defined by corresponding ones of the partitions 84 and the two non-woven fabrics 92.

As described above, the HC adsorbing sheet 82 of the third embodiment is completed, and the lateral surface of the HC adsorbing sheet 82 is inclined.

The HC adsorbing sheet 82 thus manufactured is disposed inside the air cleaner 80 such that the amount of activated carbon contained in the vertically lower portion (as indicated by an arrow J in FIG. 8) is large and that the amount of activated carbon contained in the vertically upper portion (as indicated by an arrow I in FIG. 8) is small.

On the other hand, as shown in FIG. 7, an air filter 94 is disposed on the other side of the first intake pipe 28 with respect to the HC adsorbing sheet 82.

Furthermore, a second intake pipe 96 is connected to the vertically upper portion (as indicated by an arrow I in FIG. 7) of the air cleaner 80 on the other side of the HC adsorbing sheet 82 with respect to the air filter 94. One end of the second intake pipe 96 which is located inside the air cleaner 80 is curved vertically downwards, and extends to the region where the amount of activated carbon 90 contained in the HC adsorbing sheet 82 is large.

According to the evaporative fuel adsorbing member 82 and the air cleaner 80 of the third embodiment, evaporative fuel that has flown backwards from the engine side flows into the air cleaner 80 through the first intake pipe 28. Because the evaporative fuel is heavier than air, it accumulates in the vicinity of a bottom portion in the air cleaner 80.

Thus, by disposing the HC adsorbing sheet 82 such that the amount of activated carbon contained in the vertically lower portion (as indicated by the arrow J in FIG. 7) of the air cleaner 80 is large and that the amount of activated carbon contained in the vertically upper portion (as indicated by the arrow I in FIG. 7) of the air cleaner 80 is small as in the case of the third embodiment, it becomes possible to efficiently adsorb HC in the portion with a high concentration of HC, and to efficiently adsorb HC in the portion with a low concentration of HC. That is, HC can be efficiently adsorbed in accordance with differences in concentration thereof.

Figure 20A:
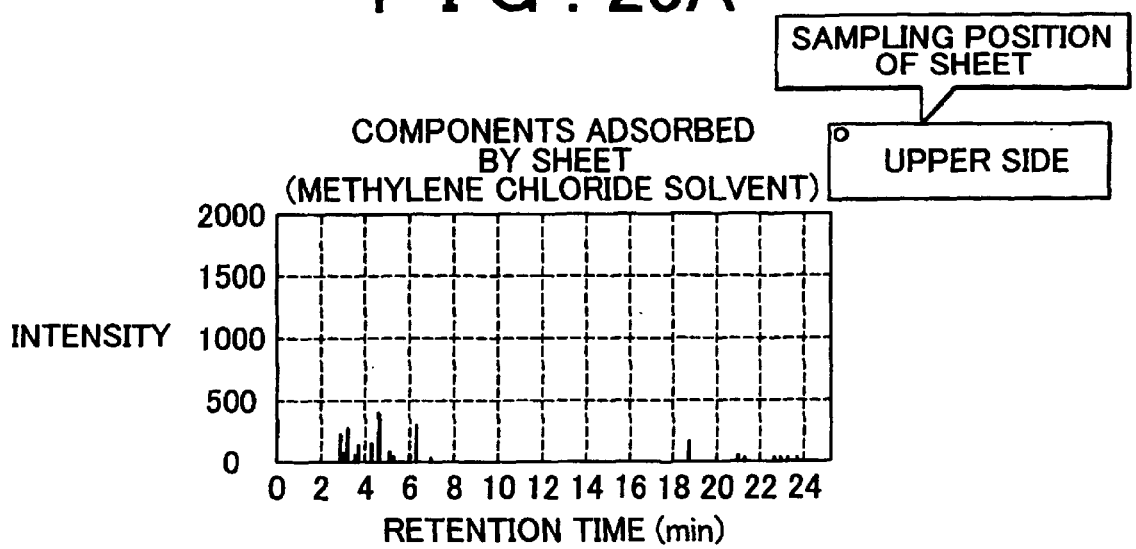
FIGS. 20A to 20C are partial views showing the results of research on deteriorated components in the evaporative fuel adsorbing member.
Figure 20B:
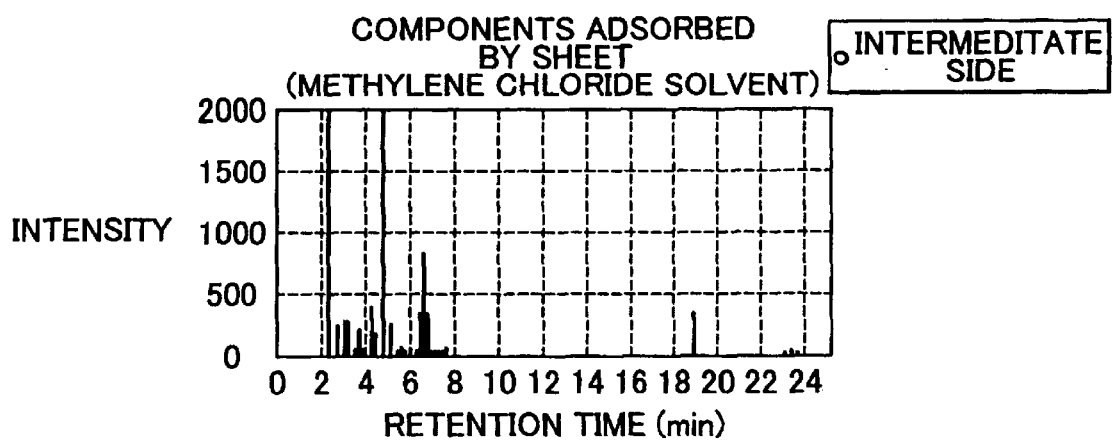
Figure 20C:
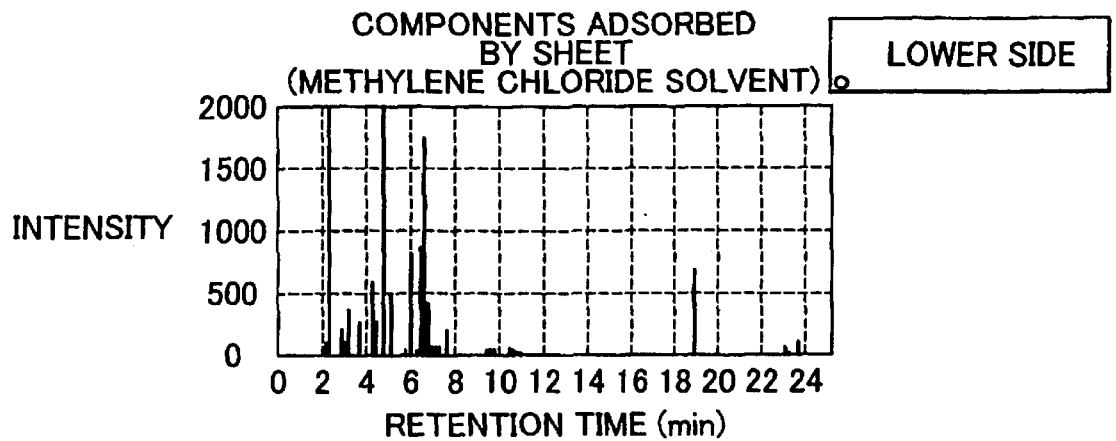

As shown in FIG. 20, it has been experimentally revealed that the amount of HC adsorbed by the HC adsorbing sheet 82 increases in proportion to a decrease in distance from the vertically lower side of the air cleaner 80.

On the other hand, one end of the second intake pipe 96 extends to the region where the amount of activated carbon 90 contained in the HC adsorbing sheet 82 is large. Thus, as in the case of the second embodiment, the efficiency in purging HC can be prevented from declining.

In particular, as opposed to the HC adsorbing sheet 52 of the second embodiment, the HC adsorbing sheet 82 of the third embodiment does not require the upper net or the lower net. Therefore, it is possible to enhance the efficiency in manufacturing the HC adsorbing sheet 82, and to reduce the manufacturing cost.

Figure 10:
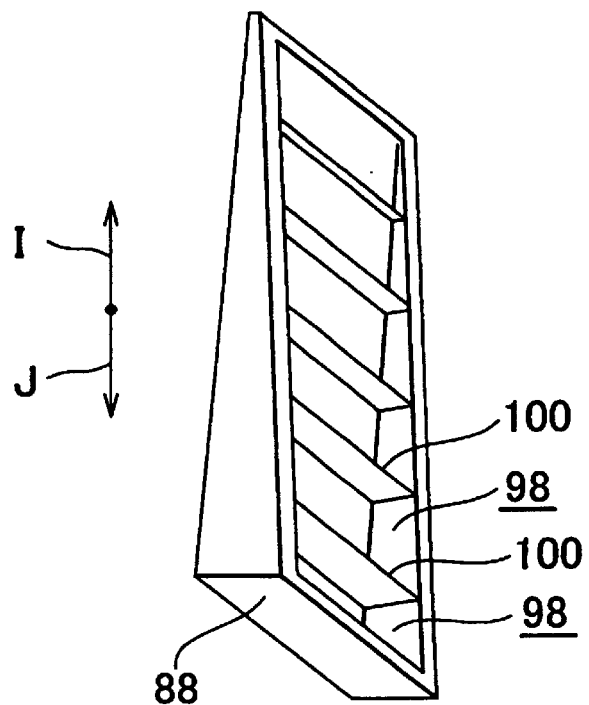
FIG. 10 is a perspective view of a modification example of a casing constituting the evaporative fuel adsorbing member in accordance with the third embodiment.

As in the case of the third embodiment, the partitions 84 may be arranged such that the chambers 86 are formed like grids. However, arrangement of the partitions 84 is not limited thereto. As a casing 88B of FIG. 10, it is also appropriate that partitions 100 be arranged such that chambers 98 are formed like columns. The casing 88A of FIG. 8 and the casing 88B of FIG. 10 can be regarded as a casing of the invention.

However, if the partitions 84 are arranged such that the chambers 86 are formed like grids, the amount of activated carbon 90 contained in each of the chambers 86 can be prevented from becoming partially inhomogeneous.

By changing the height of the partitions 84, it becomes possible to easily adjust the amount of activated carbon 90 contained in each of the chamber 86, and to efficiently adsorb evaporative fuel.

[Fourth Embodiment]

Next, the evaporative fuel adsorbing member and the air cleaner in accordance with the fourth embodiment of the invention will be described.

The description of constructional details identical to those of the evaporative fuel adsorbing member and the air cleaner in accordance with the first embodiment will be suitably omitted.

Figure 11:
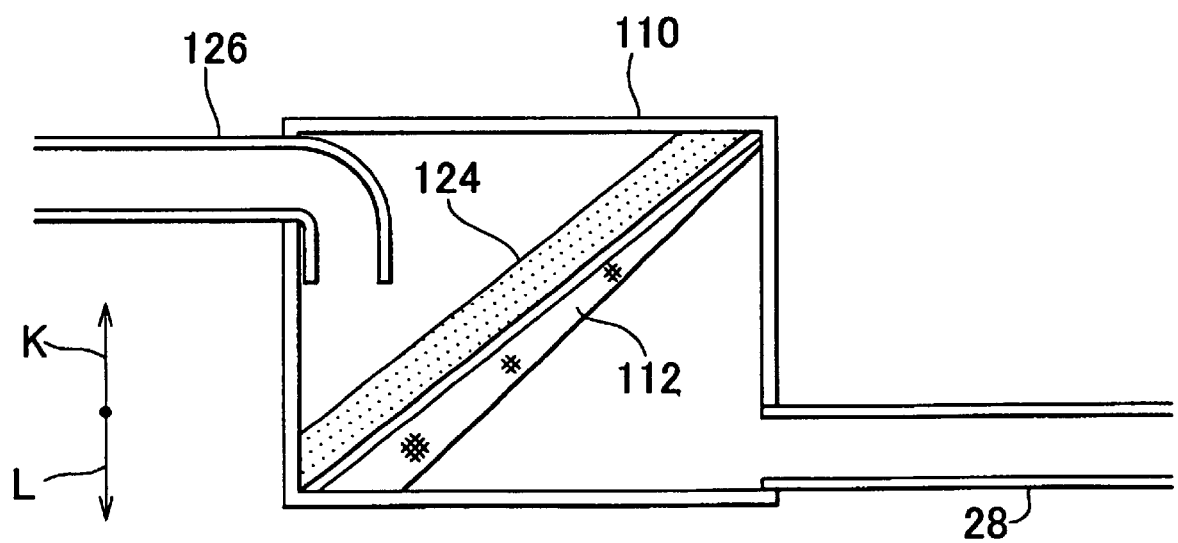
FIG. 11 is a structural view of an air cleaner in accordance with a fourth embodiment of the invention.

As shown in FIG. 11, the first intake pipe 28 is connected to a vertically lower portion (as indicated by an arrow L in FIG. 11) of an air cleaner 110 of the fourth embodiment.

An HC adsorbing sheet 112 is disposed inside the air cleaner 110 while being inclined with respect to the vertical direction.

Figure 12A:
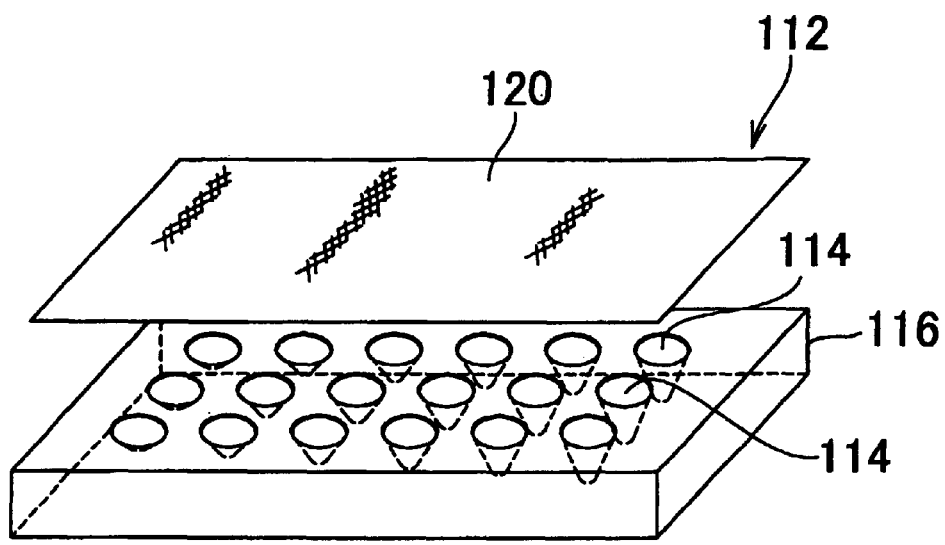
FIGS. 12A and 12B are an exploded view of an evaporative fuel adsorbing member in accordance with the fourth embodiment.
Figure 13:
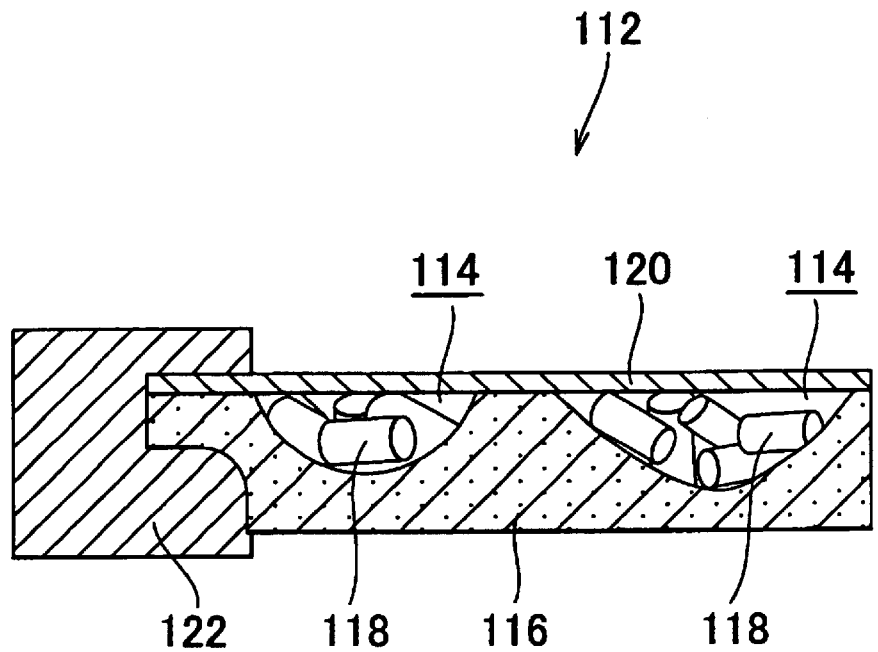
FIG. 13 is a cross-sectional view of the evaporative fuel adsorbing member in accordance with the fourth embodiment.

As shown in FIGS. 12A and 13, the HC adsorbing sheet 112 has a sponge 116 in which a plurality of dents 114 are formed. The dents 114 increase in depth in proportion to a decrease in distance from the vertically lower side (as indicated by the arrow L in FIG. 11).

The sponge 116 is highly pervious to air. However, it is not absolutely required that the sponge 116 be used. Other materials can also be used as long as they are highly pervious to air.

Activated carbon 118 (adsorbent) for adsorbing HC is disposed in the dents 114. Hence, the amount of activated carbon 118 contained in each of the dents 114 increases in proportion to an increase in depth of that dent 114. Thus, the amount of activated carbon 118 contained in each of the dents 114 is determined by adjusting the depth of that dent 114.

As shown in FIGS. 12A and 13, a fine non-woven cloth 120 for closing the dents 114 and capturing fragments of activated carbon 118 is stuck on one lateral surface of the sponge 116.

Furthermore, a casing 122 is attached to outer peripheries of the sponge 116 and the non-woven cloth 120.

The HC adsorbing sheet 112 of the fourth embodiment is completed as described above.

Figure 12B:
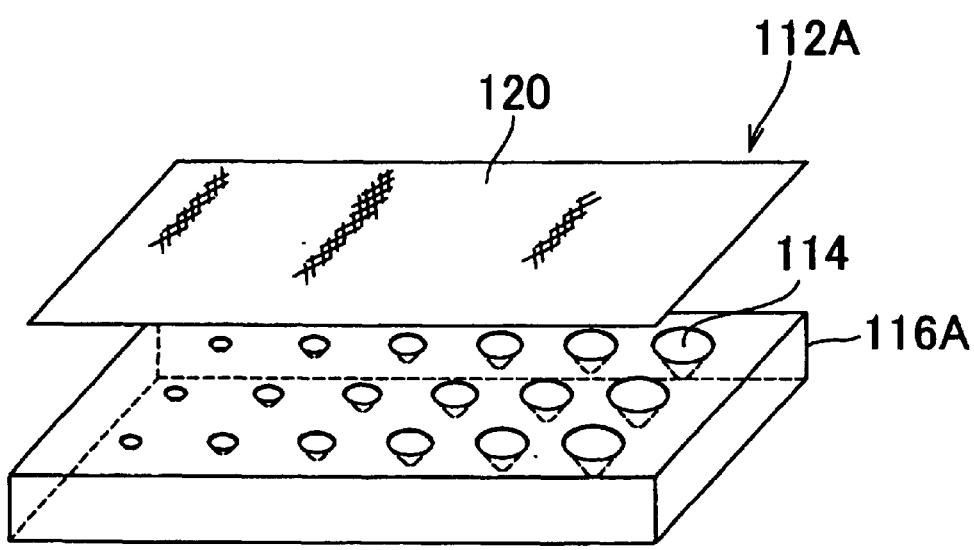

As shown in FIG. 12B, a sponge 116A in which a plurality of dents 114A are formed may be used as a sponge that is different in type from the sponge 116. The dents 114A increase in opening areas in proportion to a decrease in distance from the vertically lower side (as indicated by the arrow L in FIG. 11).

The HC adsorbing sheet 112 thus manufactured is disposed inside the air cleaner 110 such that the amount of activated carbon contained in the vertically lower portion (as indicated by the arrow L in FIG. 11) is large and that the amount of activated carbon contained in the vertically upper portion (as indicated by an arrow K in FIG. 11) is small.

On the other hand, as shown in FIG. 11, an air filter 124 is disposed on the other side of the first intake pipe 28 with respect to the HC adsorbing sheet 112. It is to be noted herein that the air filter 124 is disposed substantially parallel to the HC adsorbing sheet 112.

Furthermore, a second intake pipe 126 is connected to the vertically upper portion (as indicated by the arrow K in FIG. 11) of the air cleaner 110 on the other side of the HC adsorbing sheet 112 with respect to the air filter 124.

One end of the second intake pipe 126 which is located inside the air filter 110 is curved vertically downwards, and extends to the region where the amount of activated carbon 118 contained in the HC adsorbing sheet 112 is large.

According to the evaporative fuel adsorbing member 112 and the air cleaner 110 of the fourth embodiment, evaporative fuel that has flown backwards from the engine side flows into the air cleaner 110 through the first intake pipe 28. Because the evaporative fuel is heavier than air, it accumulates in the vicinity of a bottom portion in the air cleaner 110.

Thus, as in the case of the fourth embodiment, the HC adsorbing sheet 112 is disposed such that the amount of activated carbon contained in the vertically lower portion (as indicated by the arrow L in FIG. 11) of the air cleaner 110 is large and that the amount of activated carbon contained in the vertically upper portion (as indicated by an arrow K in FIG. 11) is small. It is thus possible to efficiently adsorb HC in the portion with a high concentration of HC, and to efficiently adsorb HC in the portion with a low concentration of HC. That is, HC can be efficiently adsorbed in accordance with differences in concentration thereof.

On the other hand, one end of the second intake pipe 126 extends to the region where the amount of activated carbon 118 contained in the HC adsorbing sheet 112 is large. Thus, as in the case of the second embodiment, the efficiency in purging HC can be prevented from declining.

In particular, since the HC adsorbing sheet 112 of the fourth embodiment can prevent fragmented activated carbon 118 from popping out of the HC adsorbing sheet 112 by means of the sponge 116, the lower non-woven cloth 62 constituting the HC adsorbing sheet 52 of the second embodiment is dispensed with. As a result, the efficiency in manufacturing the HC adsorbing sheet 112 can be enhanced, and the manufacturing cost can be reduced.

In the aforementioned second to fourth embodiments, one end of each of the second intake pipes 66, 96, 126 exists in a corresponding one of the air cleaners 50, 80, 110, and extends to the region where the amount of activated carbon contained in a corresponding one of the HC adsorbing sheets 52, 82, 112 is large. However, the invention is not limited to these constructions.

Figure 14:
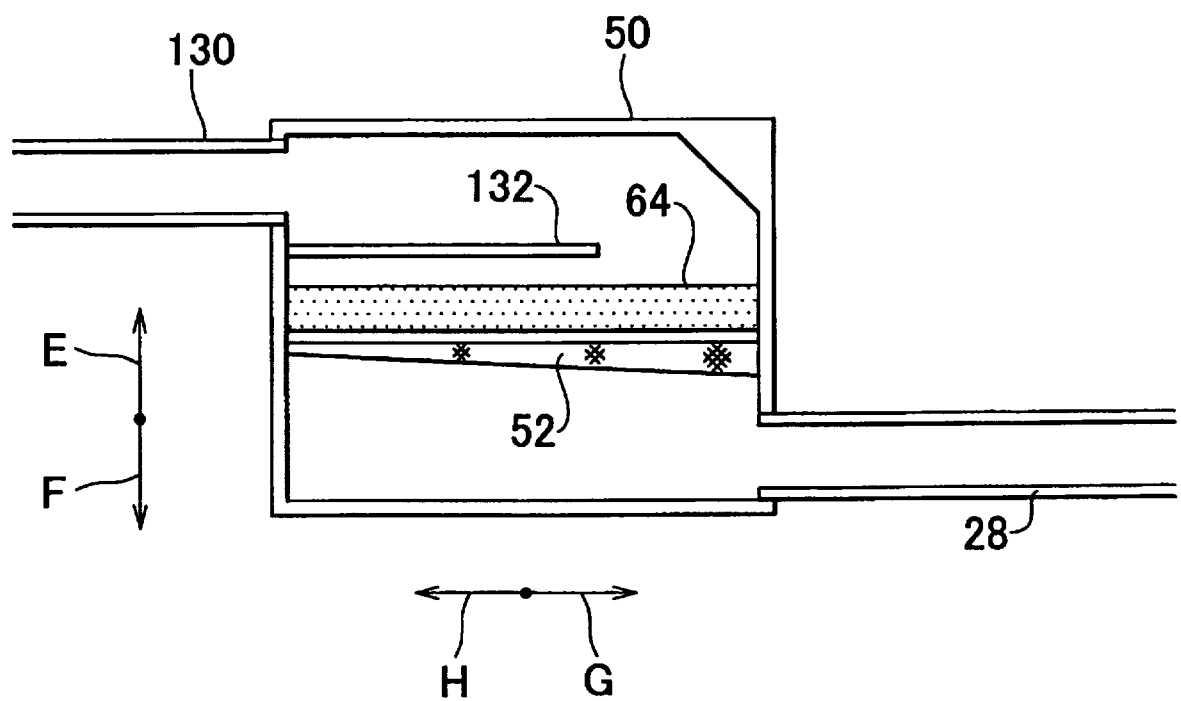
FIG. 14 is a structural view of an air cleaner in accordance with a modification example of the first to fourth embodiments.
Figure 15:
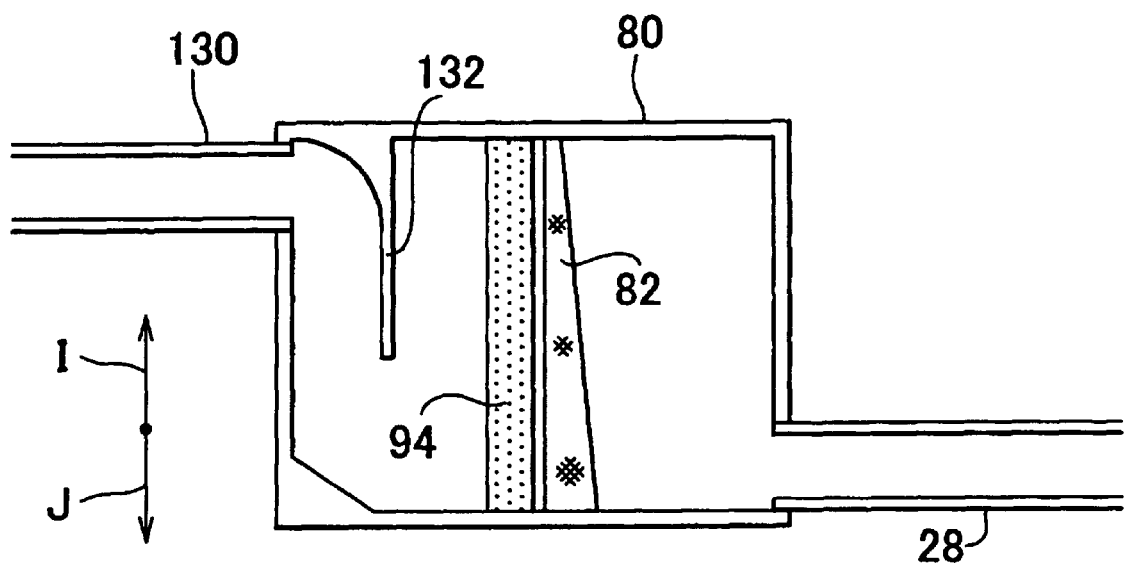
FIG. 15 is a structural view of an air cleaner in accordance with a modification example of the first to fourth embodiments.
Figure 16:
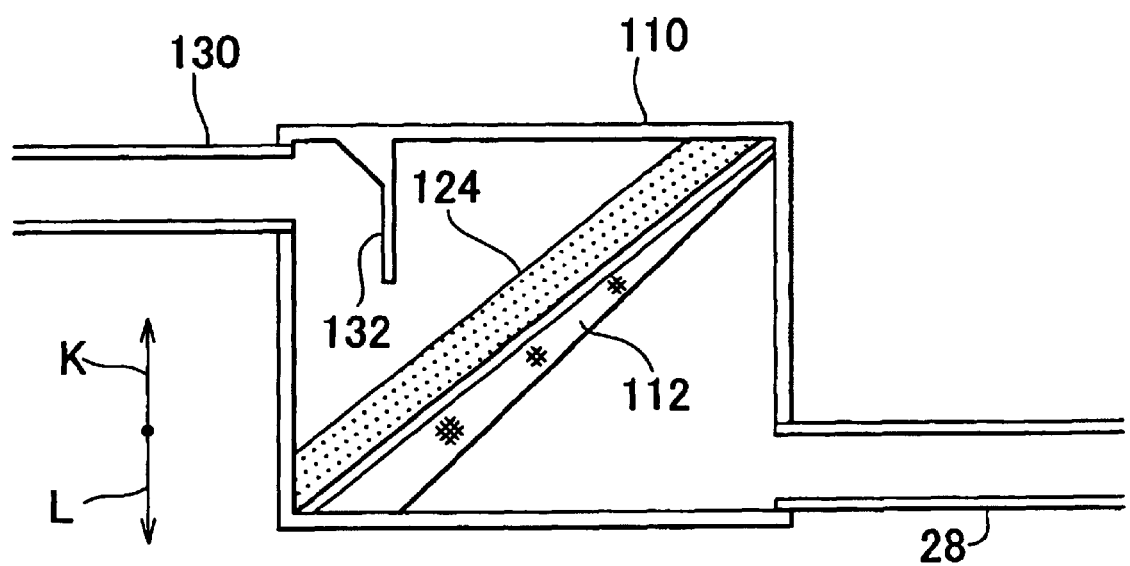
FIG. 16 is a structural view of an air cleaner in accordance with a modification example of the first to fourth embodiments.

For example, as shown in FIGS. 14 to 16, a second intake pipe 130 has an end connected to the air cleaner 50, but this end is not inside the air cleaner 50. Instead, it is also appropriate that a convex portion 132 be formed as an inner wall of the air cleaner 50 and be designed to supply intake air to a region where the amount of activated carbon contained in the HC adsorbing sheet 52 is large.

By forming the convex portion 132 as mentioned above, intake air can be forcibly supplied to the region where the amount of activated carbon contained in the HC adsorbing sheet 52 is large. Thus, the purging efficiency can be prevented from declining. The convex portion 132 can be easily formed by plastic molding (using a mold or the like).

Figure 17:
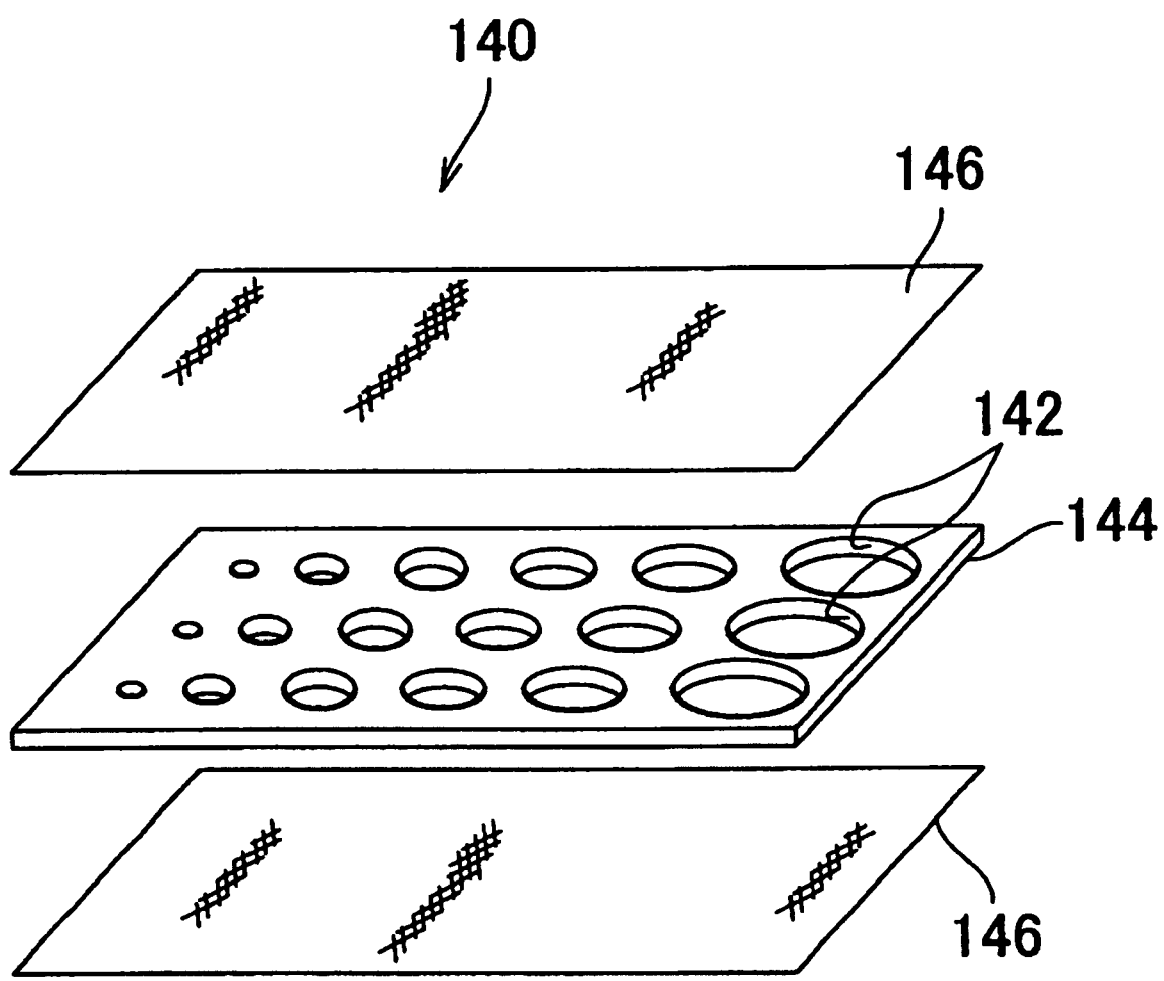
FIG. 17 is an exploded view of an evaporative fuel adsorbing member in accordance with a modification example of the first to fourth embodiments.

As shown in FIG. 17, instead of using upper and lower nets, a resin partition plate 144 in which a plurality of holes 142 are formed may be used in an HC adsorbing sheet 140. Fine non-woven fabrics 146 are attached to upper and lower surfaces of the partition plate 144. In addition, the partition plate 144 and the non-woven fabrics 146 are fixed along their outer peripheries by a casing (not shown). The partition plate 144 can be regarded as a casing of the invention.

In this case, the amount of activated carbon contained in each of the holes 142 can be adjusted by changing opening areas of the holes 142. It is appropriate that the opening areas be large in the region where the amount of activated carbon contained in each of the holes 142 is large, and that the opening areas of the holes 142 be small in the region where the amount of activated carbon contained in each of the holes 142 is small. If the holes are all made equal in size, it is appropriate that the number of the holes formed be large in the region where the amount of activated carbon contained in each of the holes is large, and that the number of the holes formed be small in the region where the amount of activated carbon contained in each of the holes is small.

Figure 18:
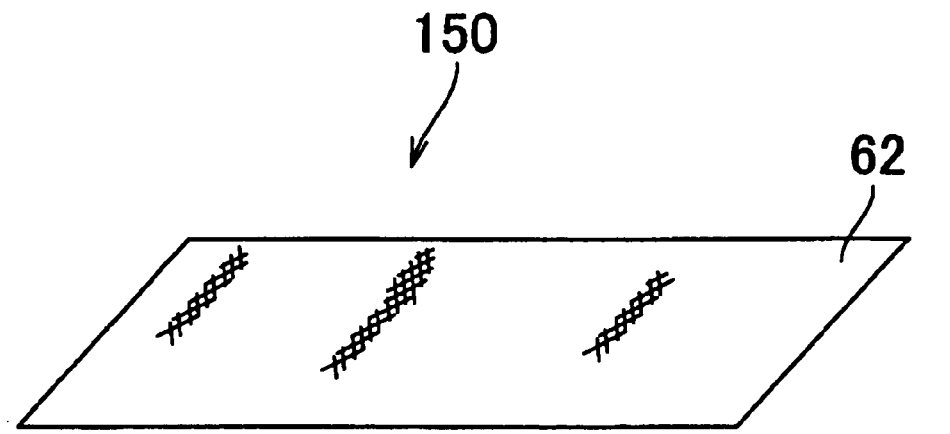
FIG. 18 is an exploded view of an evaporative fuel adsorbing member in accordance with a modification example of the first to fourth embodiments.
Figure 18:
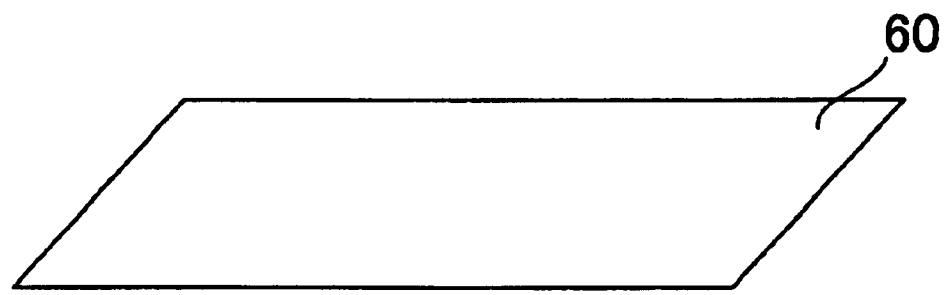
Figure 18:
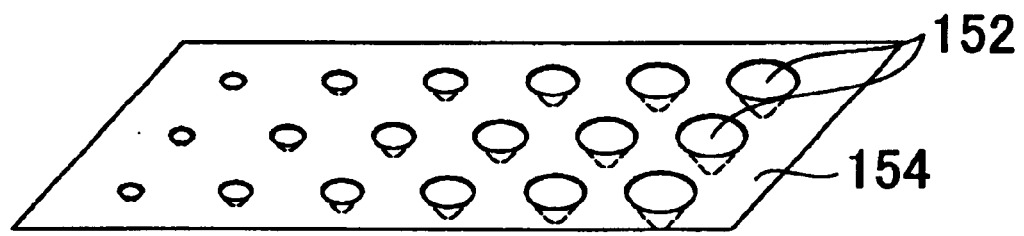
Figure 18:
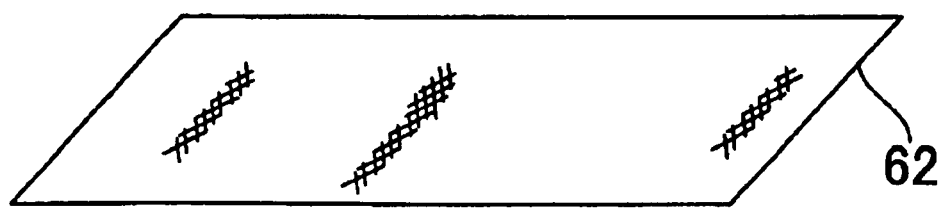

Furthermore, as shown in FIG. 18, a lower net 154 in which a plurality of dents 152 are formed is used in an HC adsorbing sheet 150. The lower net 154 is made of thermoplastic resin. The dents 152 are constant in depth, and the amount of activated carbon contained in each of the dents 152 can be adjusted by changing the opening area of that dent 152. It is appropriate that the opening areas of the dents 152 be large in the region where the amount of activated carbon contained in each of the dents 152 is large, and that the opening areas of the dents 152 be small in the region where the amount of activated carbon contained in each of the dents 152 is small.

The HC adsorbing sheet 150 is identical in other constructional details to the HC adsorbing sheet 52 of the second embodiment. Although the openings of the dents 152 are circular, they can assume other shapes.

Instead of the HC adsorbing sheets mentioned in the aforementioned embodiments, it is also appropriate that an HC adsorbing sheet constructed as described below be disposed inside an air cleaner.

Figure 21:
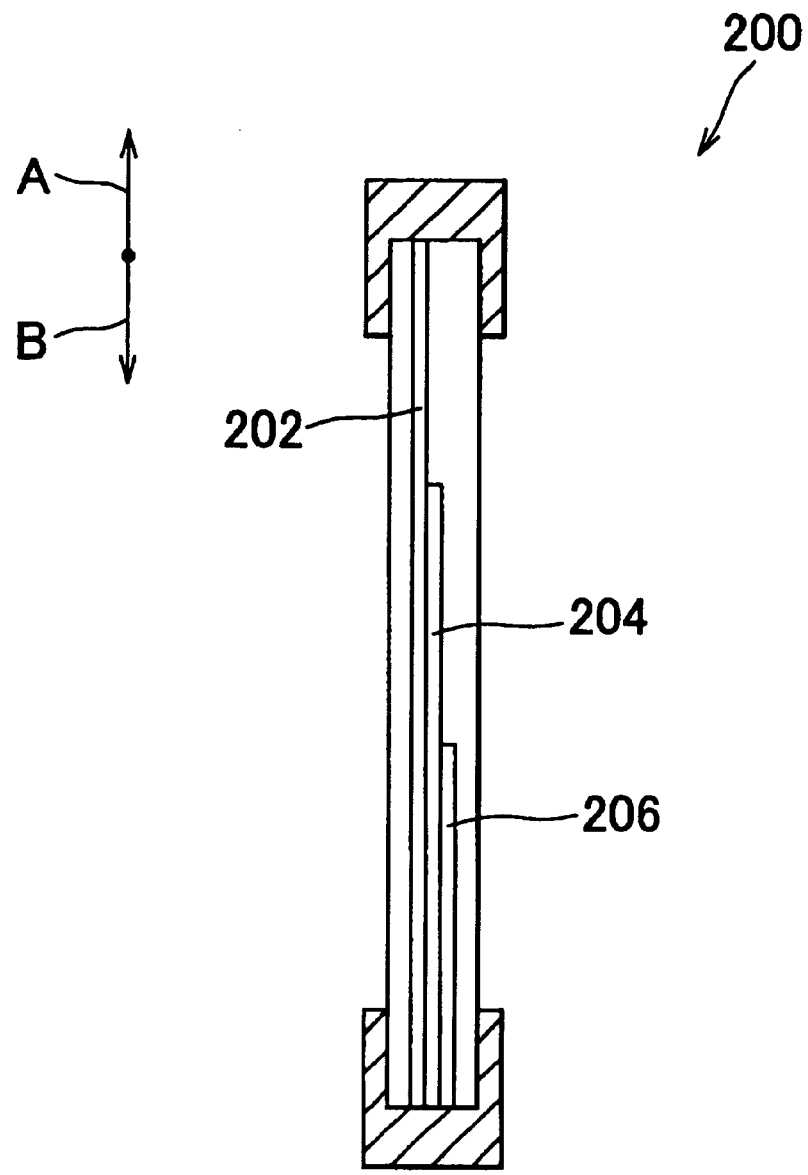
FIG. 21 is a cross-sectional view of an evaporative fuel adsorbing member in accordance with a modification example of the first to fourth embodiments.

As shown in FIG. 21, an HC adsorbing sheet 200 (evaporative fuel adsorbing member) is disposed inside an air cleaner (not shown) substantially parallel to the gravitational direction (vertical direction).

The HC adsorbing sheet 200 has a first sheet 202 containing first activated carbon (not shown). The first sheet 202 extends from a ceiling surface to a bottom surface of the air cleaner 14 (see FIG. 1).

A second sheet 204 containing activated carbon (not shown) is disposed in a superimposed manner on the first sheet 202 on the other side (as indicated by an arrow D in FIG. 21) of the engine side (as indicated by an arrow C in FIG. 21). The second sheet 204 extends from a bottom portion of the first sheet 202 to a position corresponding to about two-thirds of the height of the first sheet 202.

Furthermore, a third sheet 206 containing activated carbon (not shown) is disposed in a superimposed manner on the second sheet 204 on the other side (as indicated by the arrow D in FIG. 21) of the engine side (as indicated by the arrow C in FIG. 21). The third sheet 206 extends from the bottom portion of the first sheet 202 to a position corresponding to about half of the height of the first sheet 202.

A three-layer structure having the first, second and third sheets 202, 204, 206 containing activated carbon is formed on the vertically lower side (as indicated by an arrow B in FIG. 21) of the HC adsorbing sheet 200. A one-layer structure having the first sheet 202 containing activated carbon is formed on the vertically upper side (as indicated by an arrow A in FIG. 21) of the HC adsorbing sheet 200. A two-layer structure having the first and second sheets 202, 204 containing activated carbon is formed between them.

By thus disposing in a superimposed manner the first, second and third sheets 202, 204, 206 containing activated carbon with different areas in a direction in which air flows, a large amount of activated carbon can be disposed inside the air cleaner 14 on the vertically lower side. Thus, HC can be efficiently adsorbed.

Figure 22:
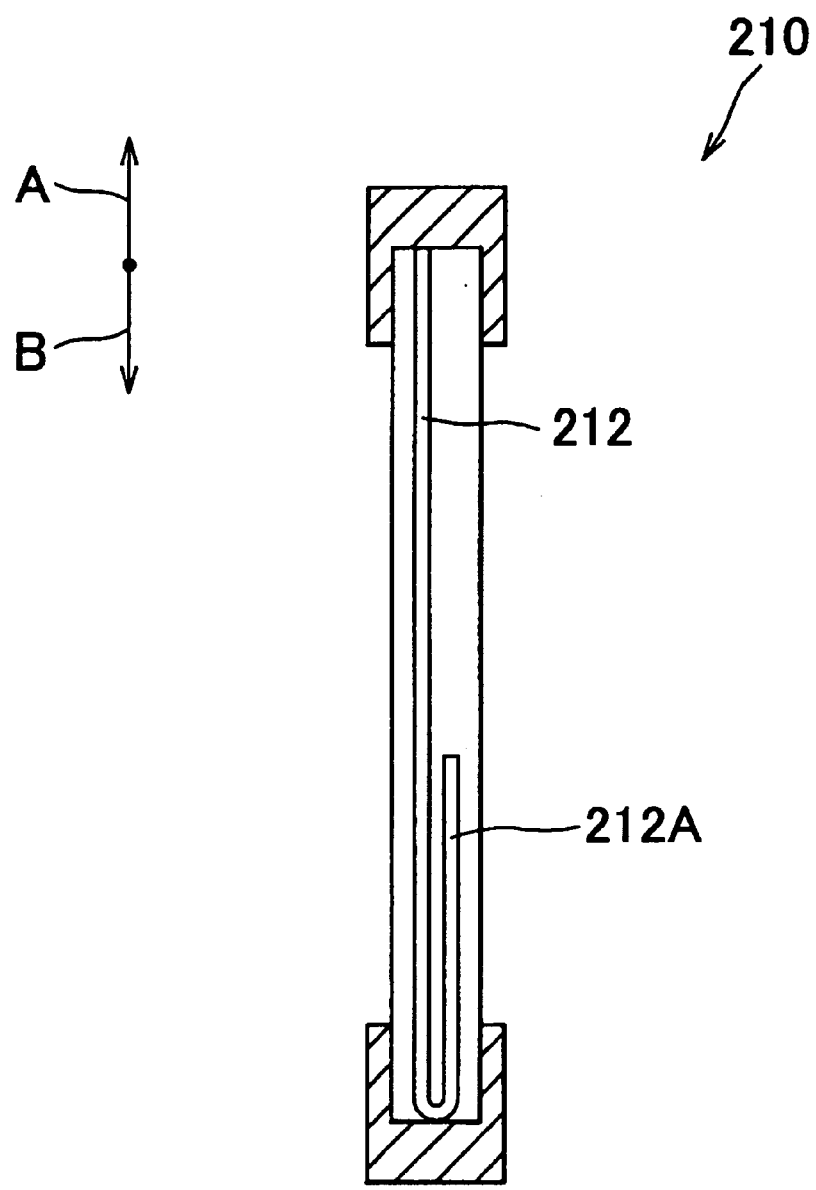
FIG. 22 is a cross-sectional view of an evaporative fuel adsorbing member in accordance with a modification example of the first to fourth embodiments.

As shown in FIG. 22, an HC adsorbing sheet (evaporative fuel adsorbing member) is disposed inside an air cleaner (not shown) substantially parallel to the gravitational direction (vertical direction).

The HC adsorbing sheet 210 has a sheet 212 containing activated carbon (not shown). The sheet 212 is folded toward the other side (as indicated by an arrow D in FIG. 22) of the engine side (as indicated by an arrow C in FIG. 22) on the vertically lower side (as indicated by an arrow B in FIG. 22).

A folded end 212A of the sheet 212 reaches a vertically substantially central region inside the air cleaner.

As in the case of the HC adsorbing sheet 200 mentioned above, the HC adsorbing sheet 210 can efficiently adsorb HC. The HC adsorbing sheet 210 has the single sheet 212 containing activated carbon. Thus, the HC adsorbing sheet 210 can be manufactured at a low cost.

As shown in FIG. 23A, an HC adsorbing sheet 220 (evaporative fuel adsorbing member) is disposed inside an air cleaner (not shown) substantially parallel to the gravitational direction (vertical direction).

The HC adsorbing sheet 220 has a sheet 222 containing first activated carbon (not shown) with a relatively small pore diameter and second activated carbon (not shown) with a relatively large pore diameter.

The first activated carbon with the relatively small pore diameter and the second activated carbon with the relatively large pore diameter are distinguished from each other in the sheet 222. The first activated carbon with the relatively small pore diameter is in the sheet 222 from a vertically substantially central portion to an upper portion 222A (low-boiling component adsorbing member) (as indicated by an arrow A in FIG. 23A). The second activated carbon with the relatively large pore diameter is located in the sheet 222 from the vertically substantially central portion to a lower portion 222B (high-boiling component adsorbing member) (as indicated by an arrow B in FIG. 23A).

The sheet 222 containing first and second activated carbon is constant in thickness in a direction in which air flows.

As shown in FIG. 23B, it is also appropriate that the amount of the first activated carbon with the relatively small pore diameter contained in an upper portion 224A of a sheet 224 be increased in proportion to a decrease in distance from the vertically lower side of the sheet 224. It is also appropriate that the amount of the second activated carbon with the relatively large pore diameter contained in a lower portion 224B of the sheet 224 be increased in proportion to a decrease in distance from the vertically lower side of the sheet 224.

Hence, in the direction in which air flows, the sheet 224 containing the first and second activated carbon shown in FIG. 23B increases in thickness in proportion to a decrease in distance from the vertically lower side (as indicated by an arrow B in FIG. 23B).

The HC adsorbing sheet 220 contains a plurality of kinds of activated carbon with different pore diameters, and these kinds of activated carbon are distinguished from one another such that activated carbon with a relatively large pore diameter is located on the side of a bottom surface of an air cleaner. Thus, high-boiling components, i.e., components with high boiling points, of evaporative fuel floating on the side of the bottom surface of the air cleaner can be efficiently adsorbed by activated carbon with the relatively large pore diameter.

As shown in FIGS. 24A to 24E, each of HC adsorbing sheets 230, 240, 250, 260, 270 (evaporative fuel adsorbing members) is disposed inside a corresponding one of air cleaners (not shown) substantially parallel to the gravitational direction (vertical direction).

As shown in FIG. 24A, the HC adsorbing sheet 230 has a first sheet 232 containing first activated carbon with a relatively small pore diameter. The first sheet 232 is located extending from the ceiling surface to the bottom surface of the air cleaner 14.

A second sheet 234 containing second activated carbon with a relatively large pore diameter is disposed in a superimposed manner on the first sheet 232 on the other side (as indicated by an arrow D in FIG. 24A) of the engine side (as indicated by an arrow C in FIG. 24A). The second sheet 234 extends from a bottom portion of the first sheet 232 containing to a position corresponding to about half of the height of the first sheet 232.

As shown in FIG. 24B, it is also appropriate that the amount of the second activated carbon with a relatively large pore diameter contained in a second sheet 244 of the HC adsorbing sheet 240 be increased in proportion to a decrease in distance from the vertically lower side (as indicated by an arrow B in FIG. 24B) in the air cleaner.

On the other hand, as shown in FIG. 24C, it is also appropriate that the amount of the first activated carbon with a relatively small pore diameter contained in a first sheet 252 of the HC adsorbing sheet 250 be increased in proportion to a decrease in distance from the vertically lower side (as indicated by an arrow B in FIG. 24C) in the air cleaner.

Furthermore, as shown in FIG. 24D, it is also appropriate that both the amount of the first activated carbon contained in a first sheet 262 of the HC adsorbing sheet 260 and the amount of the second activated carbon contained in a second sheet 264 of the HC adsorbing sheet 260 be increased in proportion to a decrease in distance from the vertically lower side (as indicated by an arrow B in FIG. 24D) in the air cleaner.

As shown in FIG. 24E, it is also appropriate that first and second sheets 272, 274 of the HC adsorbing sheet 270 be equal in area, that the amount of the first activated carbon contained in the first sheet 272 be increased in proportion to a decrease in distance from the vertically upper side (as indicated by an arrow A in FIG. 24E) in the air cleaner so as to increase the thickness of the first sheet 272 in a direction of flow of air toward the vertically upper side, that the amount of the second activated carbon contained in the second sheet 274 be increased in proportion to a decrease in distance from the vertically lower side (as indicated by an arrow B in FIG. 24E) in the air cleaner so as to increase the thickness of the second sheet 274 in a direction of flow of air toward the vertically lower side, and that the first and second sheets 272, 274 be superimposed on each other.

The first and second sheets 272, 274 are equal in thickness and in the rate of change in thickness, and thus are equal in volume. Therefore, when the first and second sheets 272, 274 are superimposed on each other, the thickness in the direction in which air flows is constant.

According to the HC adsorbing sheets 230 to 270 mentioned above, low-boiling components of evaporative fuel contained in the entire air cleaner can be adsorbed by the first activated carbon contained in the first sheets 232, 252, 262, 272 and high-boiling components of evaporative fuel floating mainly in the vicinity of the bottom surface of the air cleaner 14 can be adsorbed by the second activated carbon contained in the second sheets 234, 244, 264, 274. As a result, both high-boiling components and low-boiling components of evaporative fuel can be reliably adsorbed.

In particular, since the second sheet 234 is disposed in a superimposed manner on the other side (as indicated by the arrow D in FIG. 24A) of the engine side (as indicated by the arrow C in FIG. 24A) with respect to the first sheet 232, effects of capturing evaporative fuel and preventing a decline in durability can also be achieved making use of the fact that the second activated carbon contained in the second sheet 234 has an excellent performance of adsorbing and separating high-boiling components.

Furthermore, by adopting the construction of the HC adsorbing sheet 270 shown in FIG. 24E, it becomes possible to efficiently adsorb low-boiling components of evaporative fuel mainly floating on the vertically upper side inside the air cleaner by means of the first sheet 272 containing the first activated carbon, and to adsorb high-boiling components of evaporative fuel mainly floating on the vertically lower side inside the air cleaner by means of the second sheet 274 containing the second activated carbon.

The total thickness is made constant from the vertically lower side to the vertically upper side inside the air cleaner when the first and second sheets 272, 274 are superimposed on each other, whereby the pressure loss in the first and second sheets 272, 274 can be made homogeneous as a whole.

In each of the evaporative fuel adsorbing members shown in FIGS. 24A to 24E, the high-boiling component adsorbing member is disposed in a superimposed manner on the low-boiling component adsorbing member in accordance with the concentration of high-boiling components of evaporative fuel. Thus, low-boiling components of evaporative fuel contained in the entire air cleaner can be adsorbed, and high-boiling components of evaporative fuel floating in part of the air cleaner can also be efficiently adsorbed.

Low-boiling components of evaporative fuel are not always distributed uniformly inside the air cleaner. The concentration of low-boiling components in the air cleaner is usually inconstant due to the influence of gravity.

Thus, as in the case of the evaporative fuel adsorbing members 250, 260 shown in FIGS. 24C and 24D, the amount of the low-boiling component adsorbent contained in the low-boiling component adsorbing member is different in some areas in the evaporative fuel adsorbing members 250, 260 in accordance with the concentration of low-boiling components of evaporative fuel. For example, the amount of the low-boiling component adsorbent contained in the evaporative fuel adsorbing members 250, 260 is made large in a region where the concentration of low-boiling components is high, and the amount of the low-boiling component adsorbent contained in the evaporative fuel adsorbing members 250, 260 is made small in a region where the concentration of low-boiling components is low. In this manner, low-boiling components of evaporative fuel can be efficiently adsorbed.

As in the case of the evaporative fuel adsorbing members 240, 260 shown in FIGS. 24B, 24D, and 24E, the amount of the high-boiling component adsorbent contained in the high-boiling component adsorbing member 240, 260 is different in some areas in the evaporative fuel adsorbing members 240, 260 in accordance with the concentration of high-boiling components of evaporative fuel. For example, the amount of the high-boiling component adsorbent contained in the evaporative fuel adsorbing members 240, 260 is made large in a region where the concentration of high-boiling components is high, and the amount of the high-boiling component adsorbent contained in the evaporative fuel adsorbing members 240, 260 is made small in a region where the concentration of high-boiling components is low. In this manner, high-boiling components of evaporative fuel can be efficiently adsorbed.

In general, evaporative fuel flows into an air cleaner from the side of an internal combustion engine. A high-boiling component adsorbing member has an excellent performance of adsorption and separation. Thus, if the high-boiling component adsorbing member is disposed on the side of the internal combustion engine with respect to a low-boiling component adsorbing member, high-boiling components that have once been adsorbed by the high-boiling component adsorbing member are separated therefrom by evaporative fuel floating from the side of the internal combustion engine. As a result, the capturing performance, that is, capturing the high-boiling components, of the high-boiling component adsorbing member may deteriorate.

Thus, as in the case of the evaporative fuel adsorbing members shown in FIGS. 24A to 24E, the high-boiling component adsorbing member is disposed on the other side of the internal combustion engine with respect to the low-boiling component adsorbing member, whereby evaporative fuel flowing from the side of the internal combustion engine is adsorbed by the low-boiling component adsorbing member. Therefore, high-boiling components of evaporative fuel adsorbed by the high-boiling component adsorbing member are not separated later by evaporative fuel flowing from the side of the internal combustion engine. As a result, the capturing performance of the high-boiling component adsorbing member can be prevented from deteriorating.

According to the aforementioned embodiments, evaporative fuel is efficiently adsorbed, whereby it becomes possible to prevent the pressure loss in the entire intake system from increasing, and to prevent the performance of sucking air from deteriorating. It is also possible to prevent the purging efficiency of the adsorbent from declining.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An evaporative fuel adsorbing member that is disposed inside an air cleaner connected to an internal combustion engine and that has an adsorbent for adsorbing evaporative fuel that has flown backwards from the side of the internal combustion engine, comprising:
   a first portion having a predetermined amount of the adsorbent; and
   a second portion where the evaporative fuel flows backwards at a higher concentration than the evaporative fuel flows backwards into the first portion, the second portion having more than the predetermined amount of the adsorbent.

2. The evaporative fuel adsorbing member according to claim 1, wherein the evaporative fuel adsorbing member is disposed inside the air cleaner while being oriented in a direction other than a horizontal direction, the first portion is a vertically upper portion of the evaporative fuel adsorbing member, and the second portion is a vertically lower portion of the evaporative fuel adsorbing member.

3. The evaporative fuel adsorbing member according to claim 1, wherein the second portion is disposed closer to the internal combustion engine than the first portion.

4. The evaporative fuel adsorbing member according to claim 3, wherein the evaporative fuel adsorbing member is disposed inside the air cleaner while being oriented in the horizontal direction or diagonally with respect to the vertical direction.

5. The evaporative fuel adsorbing member according to claim 1, wherein the evaporative fuel adsorbing member has a plurality of chambers containing the adsorbent and having an opening portion, and the chambers are different from one another in at least one of volume of the chamber and opening area of the opening portion.

6. The evaporative fuel adsorbing member according to claim 5, wherein the chambers are made different from one another in volume by being made different from one another in depth.

7. The evaporative fuel adsorbing member according to claim 6, wherein the chambers are formed by dents formed in a thermoplastic net with which the evaporative fuel adsorbing member is provided, and amounts of the adsorbent contained in the dents are made different from one another by making the dents different from one another in depth.

8. The evaporative fuel adsorbing member according to claim 6, wherein the chambers include the adsorbent formed in a casing with which the evaporative fuel adsorbing member is provided and are separated from one another by partitions, and amounts of the adsorbent contained in the chambers are made different from one another by making the partitions different from one another in height.

9. The evaporative fuel adsorbing member according to claim 6, wherein the chambers are formed by dents formed in an air-permeable porous member with which the evaporative fuel adsorbing member is provided, and amounts of the adsorbent contained in the dents are made different from one another by making the dents different from one another in depth.

10. The evaporative fuel adsorbing member according to claim 5, wherein the chambers are formed by dents formed in a thermoplastic net with which the evaporative fuel adsorbing member is provided, and amounts of the adsorbent contained in the dents are made different from one another by making the dents different from one another in opening area.

11. The evaporative fuel adsorbing member according to claim 5, wherein the chambers are formed in a casing with which the evaporative fuel adsorbing member is provided and are separated from one another by partitions, and amounts of the adsorbent contained in the chambers are made different from one another by making the chambers different from one another in opening area.

12. The evaporative fuel adsorbing member according to claim 5, wherein the chambers are formed by dents formed in an air-permeable porous member with which the evaporative fuel adsorbing member is provided, and amounts of the adsorbent contained in the dents are made different from one another by making the dents different from one another in opening area.

13. The evaporative fuel adsorbing member according to claim 1, wherein a larger number of sheet sections including the adsorbent are disposed in a superimposed manner in the second portion than in the first portion.

14. The evaporative fuel adsorbing member according to claim 13, wherein the evaporative fuel adsorbing member is provided with a plurality of sheets including the adsorbent, the sheet section is the sheet, and a larger number of the sheets are disposed in a superimposed manner in the second portion than in the first portion.

15. The evaporative fuel adsorbing member according to claim 13, wherein the evaporative fuel adsorbing member is constructed of a single sheet including the adsorbent, the sheet is bent into the sheet sections, and a larger number of the sheet sections are disposed in a superimposed manner in the second portion than in the first portion.

16. An air cleaner comprising:

the evaporative fuel adsorbing member according to claim 1.

17. The air cleaner according to claim 16, wherein the air cleaner is provided with a first intake pipe connected to the internal combustion engine and a second intake pipe for introducing the atmosphere from the outside, and an end of the second intake pipe which is located inside the air cleaner extends to a region close to the second portion.

18. The air cleaner according to claim 16, wherein the air cleaner is provided with a first intake pipe connected to the internal combustion engine and a second intake pipe for introducing the atmosphere from the outside, and an inner wall along which air introduced from the outside through the second intake pipe is introduced into a region close to the second portion is formed inside the air cleaner.

19. An evaporative fuel adsorbing member that is disposed inside an air cleaner connected to an internal combustion engine and that has an adsorbent for adsorbing evaporative fuel that has flown backwards from the side of the internal combustion engine, comprising:

a plurality of kinds of the adsorbent with different pore diameters, wherein the evaporative fuel flowing backwards from the side of the internal combustion engine contains a plurality of kinds of components with different boiling points, and the plurality of kinds of the adsorbent with the different pore diameters are disposed in the evaporative fuel adsorbing member in accordance with ratios among the components contained in the evaporative fuel flowing backwards.

20. The evaporative fuel adsorbing member according to claim 19, wherein the adsorbent has a first adsorbent for adsorbing high-boiling components of the evaporative fuel and a second adsorbent for adsorbing low-boiling components of the evaporative fuel, the evaporative fuel adsorbing member has a first adsorbing member containing the first adsorbent and a second adsorbing member containing the second adsorbent, and the second adsorbing member is disposed in a superimposed manner on the first adsorbing member in accordance with a concentration of the high-boiling components of the evaporative fuel flowing backwards.

21. The evaporative fuel adsorbing member according to claim 20, wherein the second adsorbing member has a first portion containing a first amount of the second adsorbent and a second portion containing a second amount of the second adsorbent that is larger than the first amount, and the evaporative fuel including a higher concentration of the low-boiling components than a concentration of the low-boiling components flowing backwards into the first portion flows backwards into the second portion.

22. The evaporative fuel adsorbing member according to claim 20, wherein the first adsorbing member has a first portion containing a first amount of the first adsorbent and a second portion containing a second amount of the first adsorbent that is larger than the first amount, and the evaporative fuel including a higher concentration of the high-boiling components than a concentration of the high-boiling components flowing backwards into the first portion flows backwards into the second portion.

23. The evaporative fuel adsorbing member according to claim 20, wherein the first and second adsorbing members are equal in volume, and the first and second adsorbing members are superimposed on each other to constitute a unit which is constant in thickness along a direction in which air flows.

24. The evaporative fuel adsorbing member according to claim 20, wherein the second adsorbing member is disposed on the other side of the internal combustion engine with respect to the first adsorbing member.

* * * * *